(12) United States Patent
Sugimoto et al.

(10) Patent No.: US 9,633,418 B2
(45) Date of Patent: Apr. 25, 2017

(54) IMAGE PROCESSING DEVICE, IMAGING APPARATUS, IMAGE PROCESSING METHOD, AND PROGRAM

(71) Applicant: FUJIFILM Corporation, Tokyo (JP)

(72) Inventors: Masahiko Sugimoto, Saitama (JP); Kenkichi Hayashi, Saitama (JP); Yousuke Naruse, Saitama (JP); Kosuke Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/287,886

(22) Filed: Oct. 7, 2016

(65) Prior Publication Data

US 2017/0024863 A1    Jan. 26, 2017

Related U.S. Application Data

(63) Continuation of application No. PCT/JP2015/059627, filed on Mar. 27, 2015.

(30) Foreign Application Priority Data

Apr. 11, 2014 (JP) ................................. 2014-082135

(51) Int. Cl.
*G06K 9/40* (2006.01)
*G06T 5/00* (2006.01)
(Continued)

(52) U.S. Cl.
CPC ............... *G06T 5/003* (2013.01); *G06T 5/20* (2013.01); *G06T 2207/20008* (2013.01)

(58) Field of Classification Search
CPC ............. G06K 9/00; H03H 21/00; G06T 5/00
(Continued)

(56) References Cited

U.S. PATENT DOCUMENTS 5,696,850 A * 12/1997 Parulski ................. G06T 5/003
348/231.6
8,335,393 B2 * 12/2012 Kotani .................... G06T 5/003
382/154
(Continued)

FOREIGN PATENT DOCUMENTS

JP     2002-344798 A     11/2002
JP     2011-119874 A      6/2011
(Continued)

OTHER PUBLICATIONS

International Search Report, issued in PCT/JP2015/059627, PCT/ISA/210, dated Jun. 23, 2015.
(Continued)

*Primary Examiner* — Abolfazl Tabatabai
(74) *Attorney, Agent, or Firm* — Birch, Stewart, Kolasch & Birch, LLP

(57) ABSTRACT

An image processing unit 36 includes an information acquisition unit 40, a filter acquisition unit 42, and a filter processing unit 44. The information acquisition unit 40 acquires imaging information of original image data which is acquired by capturing an object image using an optical system. In a case in which the imaging information includes the first imaging condition and does not include the second imaging condition, the filter acquisition unit 42 acquires a sharpening filter which is associated with the first imaging condition and is associated with a representative condition of the second imaging condition. The filter processing unit 44 applies the sharpening filter acquired by the filter acquisition unit 42 to the original image data to acquire sharp image data.

23 Claims, 15 Drawing Sheets

(51) Int. Cl.
*G06T 5/20* (2006.01)
*H04N 5/00* (2011.01)

(58) Field of Classification Search
USPC ........ 382/260, 261, 263; 348/241, 242, 252, 348/606, 625
See application file for complete search history.

(56) References Cited

U.S. PATENT DOCUMENTS

| | | |
|---|---|---|
| 2011/0292257 A1 | 12/2011 | Hatakeyama |
| 2013/0215296 A1 | 8/2013 | Oniki et al. |
| 2015/0172614 A1 | 6/2015 | Tsuchita et al. |

FOREIGN PATENT DOCUMENTS

| | | |
|---|---|---|
| JP | 2011-123589 A | 6/2011 |
| JP | 2013-172213 A | 9/2013 |
| WO | WO 2011/122283 A1 | 10/2011 |
| WO | WO 2014/030390 A1 | 2/2014 |

OTHER PUBLICATIONS

Written Opinion of the International Searching Authority, issued in PCT/JP2015/059627, PCT/ISA/237, dated Jun. 23, 2015.
International Preliminary Report on Patentability of PCT/JP2015/059627 dated Oct. 12, 2016.

* cited by examiner

IMAGE PROCESSING DEVICE, IMAGING APPARATUS, IMAGE PROCESSING METHOD, AND PROGRAM

CROSS-REFERENCE TO RELATED APPLICATIONS

This application is a Continuation of PCT International Application No. PCT/JP2015/059627 filed on Mar. 27, 2015, which claims priority under 35 U.S.C §119(a) to Patent Application No. 2014-082135 filed in Japan on Apr. 11, 2014, all of which are hereby expressly incorporated by reference into the present application.

BACKGROUND OF THE INVENTION

1. Field of the Invention

The present invention relates to an image processing device, an imaging apparatus, an image processing method, and a program, and more particularly, to a sharpening process.

2. Description of the Related Art

In general, a sharpening process is performed in order to improve the quality of image data which is captured and acquired by an imaging apparatus such as a digital camera. The sharpening process applies a sharpening filter to image data to remove the blurring of an image. For example, a contour enhancement process or a point image restoration process is known as the sharpening process.

For example, in a camera unit disclosed in JP2011-119874A, an image recovery process is performed using an image recovery filter such as a Wiener filter.

In an image processing method disclosed in JP2011-123589A, an image recovery process for reducing a phase degradation component of an image is performed using an image recovery filter based on an optical transfer function of an imaging system.

In an imaging system disclosed in JP2002-344798A, a sharpening process is performed which extracts a spatial frequency component for improving sharpness from an image and amplifies the extracted component using parameters (for example, gain) which are set on the basis of modulation transfer function (MTF) data of an imaging optical system.

SUMMARY OF THE INVENTION

It is preferable that a sharpening filter which is applied to image data to be subjected to a sharpening process is determined according to imaging conditions or optical characteristics of an optical system. When a sharpening process is performed using a sharpening filter corresponding to imaging conditions different from the actual imaging conditions or a sharpening filter corresponding to optical characteristics different from the optical characteristics of an optical system used to capture images, in some cases, a sufficient sharpening effect is not obtained and image quality deteriorates.

Therefore, in a case in which a sharpening process is performed, it is preferable to accurately check imaging conditions or optical characteristics of the optical system and to select an appropriate filter. In particular, in a case in which a sharpening filter based on an optical transfer function (for example, a point spread function) is created, it is necessary to specify an appropriate optical transfer function corresponding to the optical characteristics of the optical system used to capture images or other imaging conditions (for example, a F numberand a focal length).

For example, in the camera unit disclosed in JP2011-119874A, image recovery information (image recovery filter) is transmitted from a lens unit. In the image processing method disclosed in JP2011-123589A, a distance (state different) is calculated in an imaging state space between the actual imaging state and a plurality of imaging states in which image recovery filters are stored and an image recovery filter at a position from the shortest distance is selected. In the imaging system disclosed in JP2002-344798A, parameters for an image sharpening process are set using the MTF data of an optical system corresponding to a spatial frequency included in an image.

In the devices disclosed in JP2011-119874A, JP2011-123589A, and JP2002-344798A, in a case in which information for an image recovery process (sharpening process) required in the devices is appropriately acquired, it is possible to appropriately perform the process. However, in a case in which a portion of the information required for the process is not capable of being acquired, it is difficult to sequentially perform the process.

In the actual sharpening process, in some cases, it is difficult to acquire the optical characteristics of the optical system or other imaging conditions. For example, in a case in which a sharpening process based on an optical transfer function is performed in a digital camera, in general, an optical transfer function or a sharpening filter provided in a lens unit or a camera body is used. However, in some cases, neither the lens unit nor the camera body includes the sharpening filter or the optical transfer function of the lens unit (optical system) which has been actually used.

In a case in which the camera body acquires imaging conditions, such as a F number or a focal length, through communication with the lens unit, the lens unit which has been used to capture images may not correspond to the camera body and may not have a communication function with the camera body. In this case, it is difficult for the camera body to acquire the imaging conditions from the lens unit. Furthermore, even in a case in which the lens unit which has been used to capture images has a communication function with the camera body, a communication failure is likely to occur according to a usage environment (for example, impact and temperature) and it is difficult for the camera body to acquire the imaging conditions from the lens unit. In addition, even in a case in which the lens unit which has been used to capture images has a communication function with the camera body and no communication failure occurs, in some cases, all of the imaging conditions are not acquired and only some of the imaging conditions are acquired.

As described above, in some cases, it is difficult to acquire the optical transfer function of the optical system or the imaging conditions due to various factors. However, there is a demand for performing the sharpening process as appropriately as possible under these conditions.

The invention has been made in view of the above-mentioned problems and an object of the invention is to provide a technique that can acquire a sharpening filter with high accuracy on the basis of acquirable imaging conditions, such as a F number or a focal length, even in a case in which it is difficult to acquire an optical transfer function of an optical system or imaging conditions.

An aspect of the invention relates to an image processing device comprising: an information acquisition unit that acquires imaging information of original image data which is acquired by capturing an object image using an optical system; a filter acquisition unit that acquires a sharpening filter on the basis of at least a first imaging condition or a second imaging condition; and a filter processing unit that applies the sharpening filter acquired by the filter acquisition unit to the original image data to acquire sharp image data. In a case in which the imaging information acquired by the information acquisition unit includes the first imaging condition and does not include the second imaging condition, the filter acquisition unit acquires the sharpening filter which is associated with the first imaging condition included in the imaging information and is associated with a representative condition of the second imaging condition.

According to this aspect, even in a case in which the imaging information includes the first imaging condition and does not include the second imaging condition and it is difficult to appropriately acquire the sharpening filter, it is possible to acquire a sharpening filter with high accuracy on the basis of the first imaging condition that can be acquired.

Preferably, one of the first imaging condition and the second imaging condition is a F number and the other is a focal length.

According to this aspect, even in a case in which it is difficult to acquire information about the F number or the focal length of the original image data, it is possible to acquire a sharpening filter with high accuracy on the basis of information about the F number or the focal length that can be acquired.

Preferably, the sharpening filter is based on an optical transfer function of the optical system.

According to this aspect, it is possible to acquire a sharpening filter that is determined on the basis of the optical transfer function of the optical system. The optical transfer function (OTF) includes a point spread function (PSF), a modulation transfer function (MTF), and a phase transfer function (PTF).

Preferably, the sharpening filter is not based on an optical transfer function of the optical system.

According to this aspect, it is possible to acquire a sharpening filter that is determined regardless of the optical transfer function of the optical system.

Preferably, the filter acquisition unit acquires a plurality of sharpening filters associated with a plurality of image heights, and the filter processing unit applies the sharpening filter to the original image data according to the image height.

According to this aspect, it is possible to acquire a sharpening filter with high accuracy according to the image height.

Preferably, the filter acquisition unit includes a filter storage unit that stores a plurality of sharpening filters which are determined according to at least the first imaging condition or the second imaging condition and a filter selection unit that selects the sharpening filter based on the imaging information from the plurality of sharpening filters stored in the filter storage unit.

According to this aspect, it is possible to acquire a sharpening filter from the plurality of sharpening filters stored in the filter storage unit.

Preferably, the filter acquisition unit includes a function acquisition unit that acquires a plurality of optical transfer functions which are determined according to at least the first imaging condition or the second imaging condition and a filter generation unit that generates the sharpening filter from an optical transfer function, which is selected from the plurality of optical transfer functions acquired by the function acquisition unit and is based on the imaging information, and acquires the sharpening filter.

According to this aspect, it is possible to acquire the sharpening filter generated from the optical transfer function on the basis of the imaging information.

Preferably, the representative condition of the second imaging condition is determined on the basis of spatial frequency characteristics of each of a plurality of sharpening filters associated with the first imaging condition.

According to this aspect, the representative condition of the second imaging condition is determined on the basis of the spatial frequency characteristics of each of the plurality of sharpening filters and it is possible to accurately acquire the sharpening filter associated with the representative condition.

For example, the spatial frequency characteristics of the sharpening filter may be determined on the basis of a response indicating the ratio of image data after the sharpening filter is applied to image data before the sharpening filter is applied for each spatial frequency. Therefore, the representative condition of the second imaging condition may be determined on the basis of the response characteristics of each of the plurality of sharpening filters associated with the first imaging condition. In this case, it is possible to accurately acquire the sharpening filter associated with the representative condition of the second imaging condition.

Preferably, the representative condition of the second imaging condition is determined on the basis of a maximum value of a response indicating a ratio of image data after each of the plurality of sharpening filters, which are associated with the first imaging condition and are associated with a plurality of second imaging conditions, is applied to image data before the sharpening filter is applied for each spatial frequency.

According to this aspect, the representative condition of the second imaging condition is determined on the basis of the maximum value of the response of the sharpening filter and it is possible to accurately acquire the sharpening filter associated with the representative condition.

Preferably, the representative condition of the second imaging condition is determined on the basis of an area of a range in which a response indicating a ratio of image data after each of the plurality of sharpening filters, which are associated with the first imaging condition and are associated with a plurality of second imaging conditions, is applied to image data before the sharpening filter is applied for each spatial frequency is greater than a first threshold value in a function indicating the response for each spatial frequency in a coordinate system in which a horizontal axis indicates the spatial frequency and a vertical axis indicates the response.

According to this aspect, the representative condition of the second imaging condition is determined on the basis of the magnitude of the response of the sharpening filter and it is possible to accurately acquire the sharpening filter associated with the representative condition.

Preferably, the first threshold value is equal to or greater than 1.

According to this aspect, the representative condition of the second imaging condition is determined on the basis of a response portion that is greater than 1 in the sharpening filter and it is possible to accurately acquire the sharpening filter associated with the representative condition.

Preferably, the image processing device further comprises a frequency analysis unit that analyzes spatial frequency characteristics of the original image data. Preferably, in a case in which it is determined that the number of components of the original image data in a specific spatial frequency range is equal to or greater than a second threshold value on the basis of an analysis result of the frequency analysis unit, the filter acquisition unit acquires the sharpening filter having a response which indicates the ratio of image data after the sharpening filter is applied to image data before the sharpening filter is applied for each spatial frequency and is lower than that of the sharpening filter associated with the representative condition of the second imaging condition.

According to this aspect, in a case in which the number of components of the original image data in a specific spatial frequency range is large, a sharpening filter with a low response is acquired.

Preferably, the image processing device further comprises a frequency analysis unit that analyzes spatial frequency characteristics of the original image data. Preferably, in a case in which it is determined that the number of components of the original image data in a specific spatial frequency range is equal to or greater than a second threshold value on the basis of an analysis result of the frequency analysis unit, the filter processing unit controls gain to reduce an increment in the sharp image data with respect to the original image data.

For example, the image processing device may further comprise a frequency analysis unit that analyzes spatial frequency characteristics of the original image data. The filter processing unit may include a filter application unit that applies the sharpening filter acquired by the filter acquisition unit to the original image data to acquire filtering image data and a gain control unit that controls the gain of the filtering image data with respect to the original image data on the basis of the imaging information to acquire sharp image data. In a case in which it is determined that the number of components of the original image data in a specific spatial frequency range is equal to or greater than the second threshold value on the basis of the analysis result of the frequency analysis unit, the gain control unit may control the gain such that an increment in the sharp image data with respect to the original image data is less than that in a case in which the gain is controlled on the basis of the imaging information.

According to this aspect, in a case in which the number of components of the original image data in a specific spatial frequency range is large, gain control is performed to reduce an increment in the sharp image data with respect to the original image data.

Preferably, the image processing device further comprises a saturated pixel analysis unit that analyzes a saturated pixel of the original image data. Preferably, in a case in which it is determined that the original image data includes a saturated pixel having a pixel value that is equal to or greater than a third threshold value on the basis of an analysis result of the saturated pixel analysis unit, the filter acquisition unit acquires the sharpening filter having a response which indicates the ratio of image data after the sharpening filter is applied to image data before the sharpening filter is applied for each spatial frequency and is lower than that of the sharpening filter associated with the representative condition of the second imaging condition.

According to this aspect, for the original image data including the saturated pixel, a sharpening filter with a low response is acquired.

Preferably, the image processing device further comprises a saturated pixel analysis unit that analyzes a saturated pixel of the original image data. Preferably, in a case in which it is determined that the original image data includes a saturated pixel having a pixel value that is equal to or greater than a third threshold value on the basis of an analysis result of the saturated pixel analysis unit, the filter processing unit controls gain to reduce an increment in the sharp image data with respect to the original image data.

For example, the image processing device may further comprise a saturated pixel analysis unit that analyzes a saturated pixel of the original image data. The filter processing unit may include a filter application unit that applies the sharpening filter acquired by the filter acquisition unit to the original image data to acquire filtering image data and a gain control unit that controls the gain of the filtering image data with respect to the original image data on the basis of the imaging information to acquire sharp image data. In a case in which it is determined that the original image data includes a saturated pixel having a pixel value that is equal to or greater than the third threshold value on the basis of an analysis result of the saturated pixel analysis unit, the gain control unit may control the gain such that an increment in the sharp image data with respect to the original image data is less than that in a case in which the gain is controlled on the basis of the imaging information.

According to this aspect, for the original image data including the saturated pixel, gain control is performed to reduce an increment in the sharp image data with respect to the original image data.

A "case in which it is determined that the original image data includes a saturated pixel" is not limited only to a case in which the pixel to be subjected to the sharpening process by the sharpening filter is the saturated pixel and includes a case in which a pixel in the vicinity of the pixel to be subjected to the sharpening process is the saturated pixel.

Preferably, the image processing device further comprises a ringing acquisition unit that acquires an amount of ringing of the sharp image data. Preferably, in a case in which the amount of ringing is equal to or greater than a fourth threshold value, the filter acquisition unit acquires the sharpening filter having a response which indicates the ratio of image data after the sharpening filter is applied to image data before the sharpening filter is applied for each spatial frequency and is lower than that of the sharpening filter associated with the representative condition of the second imaging condition.

According to this aspect, in a case in which the amount of ringing of the sharp image data is large, a sharpening filter with a low response is acquired.

Preferably, the image processing device further comprises a ringing acquisition unit that acquires an amount of ringing of the sharp image data. Preferably, in a case in which the amount of ringing is equal to or greater than a fourth threshold value, the filter processing unit controls gain to reduce an increment in the sharp image data with respect to the original image data.

For example, the image processing device may further comprise a ringing acquisition unit that acquires an amount of ringing of the sharp image data. The filter processing unit may include a filter application unit that applies the sharpening filter acquired by the filter acquisition unit to the original image data to acquire filtering image data and a gain control unit that controls the gain of the filtering image data with respect to the original image data on the basis of the imaging information to acquire sharp image data. In a case in which the amount of ringing is equal to or greater than the fourth threshold value, the gain control unit may control the gain such that an increment in the sharp image data with respect to the original image data is less than that in a case in which the gain is controlled on the basis of the imaging information.

According to this aspect, in a case in which the amount of ringing of the sharp image data is large, gain control is performed to reduce an increment in the sharp image data with respect to the original image data.

A method for acquiring the amount of ringing of the sharp image data is not particularly limited. The ringing acquisition unit may acquire the amount of ringing on the basis of predetermined conditions. For example, the ringing acquisition unit may compare the original image data with the sharp image data to acquire the amount of ringing. Alternatively, the ringing acquisition unit may analyze image characteristics, such as frequency characteristics of the sharp image data, and acquire (estimate) the amount of ringing according to whether the analysis result corresponds to predetermined conditions. The ringing acquisition unit may acquire (estimate) the amount of ringing according to whether the original image data is acquired under predetermined acquisition conditions. For example, information about the optical system used for an imaging operation for acquiring the original image data is included in the acquisition conditions. Various factors that affect the accuracy or adverse effect (for example, ringing) of the sharpening process are included in the "acquisition conditions". For example, the information about the optical system includes at least one of the lens type, F number, and zoom value of the optical system used for the imaging operation for acquiring the original image data. The ringing acquisition unit may analyze image characteristics, such as the frequency characteristics of the original image data, and acquire (estimate) the amount of ringing according to whether the analysis result corresponds to predetermined conditions. For example, the ringing acquisition unit may acquire (estimate) the amount of ringing according to whether a saturated pixel is present in the original image data.

Preferably, the image processing device further comprises an increment acquisition unit that acquires an increment in the sharp image data with respect to the original image data in a specific spatial frequency range. Preferably, in a case in which the increment is equal to or greater than a fifth threshold value, the filter acquisition unit acquires the sharpening filter having a response which indicates the ratio of image data after the sharpening filter is applied to image data before the sharpening filter is applied for each spatial frequency and is lower than that of the sharpening filter associated with the representative condition of the second imaging condition.

According to this aspect, in a case in which an increment in the sharp image data with respect to the original image data in a specific spatial frequency range is large, a sharpening filter with a low response is acquired.

Preferably, the image processing device further comprises an increment acquisition unit that acquires an increment in the sharp image data with respect to the original image data in a specific spatial frequency range. Preferably, in a case in which the increment is equal to or greater than a fifth threshold value, the filter processing unit controls gain to reduce the increment in the sharp image data with respect to the original image data.

For example, the image processing device may further comprise an increment acquisition unit that acquires an increment in the sharp image data with respect to the original image data in a specific spatial frequency range. The filter processing unit may include a filter application unit that applies the sharpening filter acquired by the filter acquisition unit to the original image data to acquire filtering image data and a gain control unit that controls the gain of the filtering image data with respect to the original image data on the basis of the imaging information to acquire sharp image data. In a case in which the increment is equal to or greater than the fifth threshold value, the gain control unit may control the gain such that an increment in the sharp image data with respect to the original image data is less than that in a case in which the gain is controlled on the basis of the imaging information.

According to this aspect, in a case in which an increment in the sharp image data with respect to the original image data in a specific spatial frequency range is large, gain controller is performed to reduce the increment in the sharp image data with respect to the original image data.

Preferably, the specific spatial frequency range is included in a range that is equal to or greater than one eighth of a sampling frequency of the original image data and is equal to or less than one fourth of the sampling frequency.

Another aspect of the invention relates to an imaging apparatus comprising an imaging element and the above-mentioned image processing device. The original image data is acquired by the imaging element.

Still another aspect of the invention relates to an image processing method including: acquiring imaging information of original image data which is acquired by capturing an object image using an optical system; acquiring a sharpening filter on the basis of at least a first imaging condition or a second imaging condition; and applying the sharpening filter to the original image data to acquire sharp image data. In a case in which the imaging information includes the first imaging condition and does not include the second imaging condition, the sharpening filter which is associated with the first imaging condition included in the imaging information and is associated with a representative condition of the second imaging condition is acquired.

Yet another aspect of the invention relates to a program that causes a computer to perform: a step of acquiring imaging information of original image data which is acquired by capturing an object image using an optical system; a step of acquiring a sharpening filter on the basis of at least a first imaging condition or a second imaging condition; and a step of applying the sharpening filter to the original image data to acquire sharp image data. In a case in which the imaging information includes the first imaging condition and does not include the second imaging condition, the sharpening filter which is associated with the first imaging condition included in the imaging information and is associated with a representative condition of the second imaging condition is acquired.

According to the invention, it is possible to acquire a sharpening filter with high accuracy on the basis of a first imaging condition that can be acquired even in a case in which imaging information includes the first imaging condition and does not include a second imaging condition and it is difficult to appropriately acquire the sharpening filter.

DESCRIPTION OF THE PREFERRED EMBODIMENTS

Embodiments of the invention will be described with reference to the accompanying drawings. In the following description, an example in which the invention is applied to a digital camera (imaging apparatus) which can be connected to a computer (personal computer (PC)) will be described.

Figure 1:
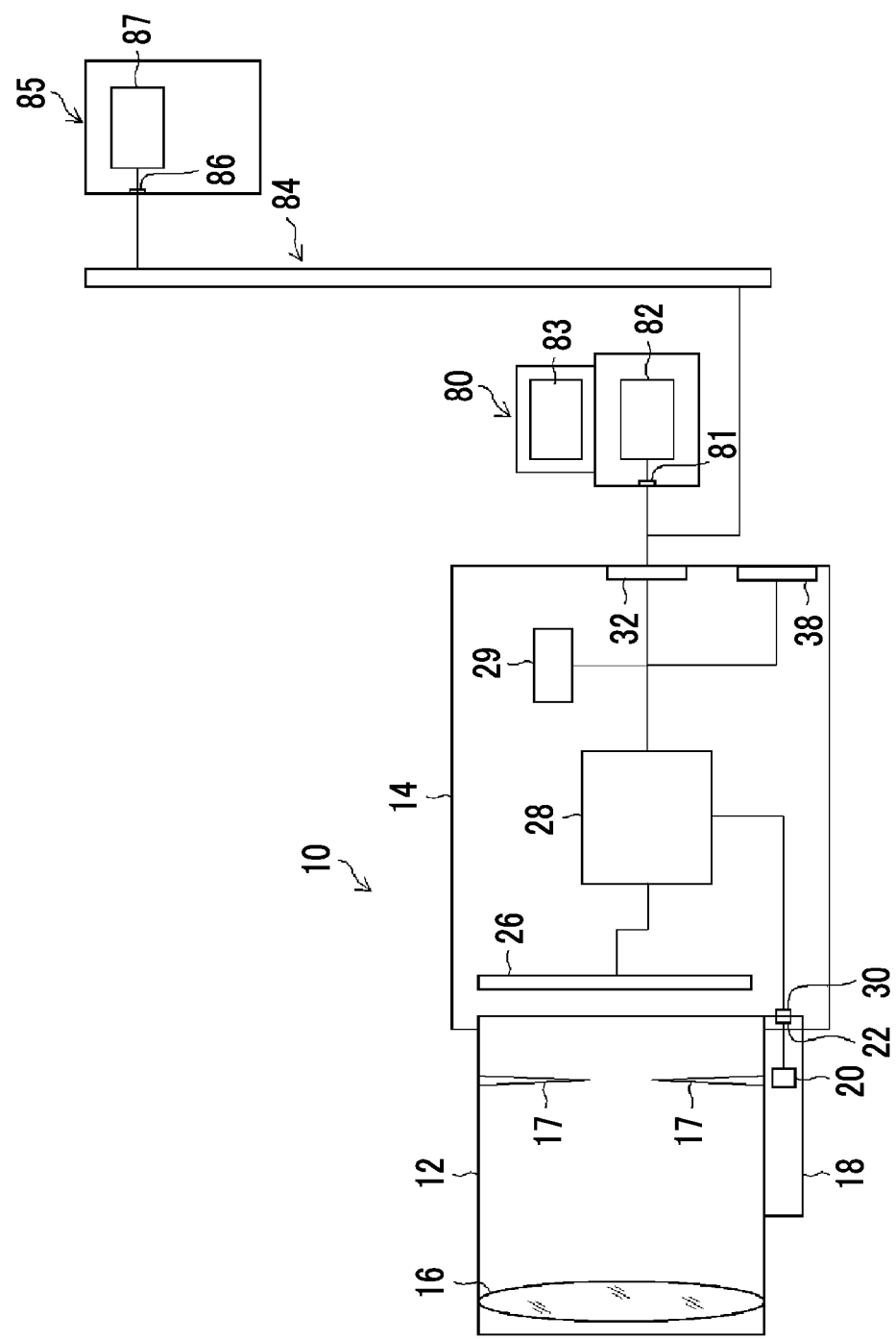
FIG. 1 is a block diagram illustrating the outline of a digital camera connected to a computer.

FIG. 1 is a block diagram illustrating the outline of the digital camera which is connected to the computer.

A digital camera 10 comprises an interchangeable lens unit 12 and a camera body 14 including an imaging element 26. The lens unit 12 and the camera body 14 are electrically connected to each other through a lens unit input/output unit 22 of the lens unit 12 and a camera body input/output unit 30 of the camera body 14.

The lens unit 12 comprises an optical system including, for example, a lens 16 and a diaphragm 17 and an optical system operation unit 18 that controls the optical system. The optical system operation unit 18 includes a lens unit controller 20 that is connected to the lens unit input/output unit 22 and an actuator (not illustrated) that operates the optical system. The lens unit controller 20 controls the optical system through the actuator, on the basis of a control signal which is transmitted from the camera body 14 through the lens unit input/output unit 22. For example, the lens unit controller 20 performs focus control or zoom control using the movement of the lens or controls the value (position) of the diaphragm 17.

The imaging element 26 of the camera body 14 includes a condensing microlens, color filters, such as red, green, and blue (R, G, and B) filters, and an image sensor (photodiode: for example, a complementary metal oxide semiconductor (CMOS) or a charge-coupled device (CCD)). The imaging element 26 converts object image light which is emitted through the optical system (for example, the lens 16 and the diaphragm 17) of the lens unit 12 into an electric signal and transmits an image signal (captured image data) to a body controller 28. That is, in this example, the imaging element 26 receives the object image which has passed through the optical system (for example, the lens 16 and the diaphragm 17), generates captured image data (hereinafter, referred to as "image data"), and transmits the image data to the body controller 28 (an "image processing unit 36" which will be described below).

Figure 2:
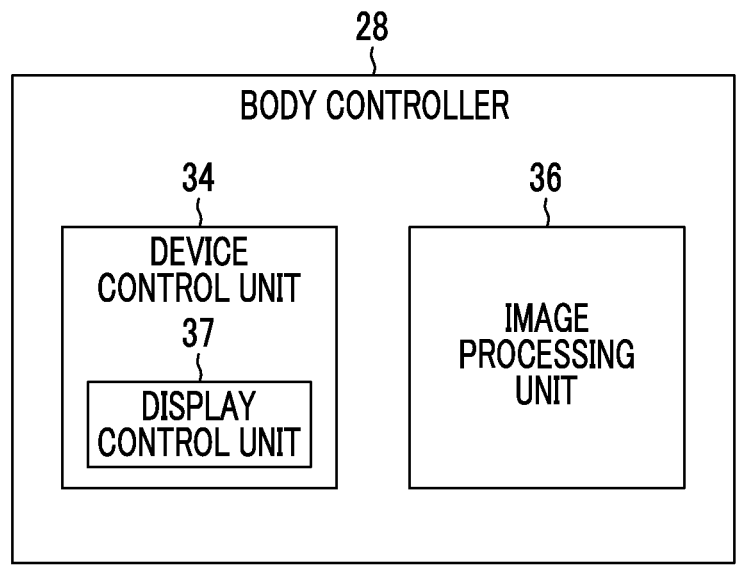
FIG. 2 is a block diagram illustrating the outline of the functional structure of a camera body controller.

FIG. 2 is a block diagram illustrating the outline of the functional structure of the body controller 28.

The body controller 28 includes a device control unit 34 and the image processing unit (image processing device) 36 and controls the overall operation of the camera body 14.

For example, the device control unit 34 has a function of controlling the output of image data from the imaging element 26, a function of generating a control signal for controlling the lens unit 12 and transmitting the control signal to the lens unit 12 (lens unit controller 20) through the camera body input/output unit 30, or a function of transmitting image data (for example, RAW data or Joint Photographic Experts Group (JPEG) data) before and after image processing to external apparatuses (for example, a computer 80) that are connected through an input/output interface 32. In this example, the device control unit 34 includes a display control unit 37 that controls a display unit 38 provided in the camera body 14. In addition, the device control unit 34 appropriately controls other types of devices provided in the digital camera 10.

The image processing unit 36 can perform any image processing for the image data transmitted from the imaging element 26, if necessary. For example, the image processing unit 36 appropriately performs various types of image processing, such as a sensor correction process, a demosaicing (synchronization) process, a pixel interpolation process, a color correction process (for example, an offset correction process, white balance processing, color matrix processing, and a gamma conversion process), RGB image processing (for example, a tone correction process and an exposure correction process), an RGB/YCrCb conversion process, and an image compression process. In addition, in this example, the image processing unit 36 performs a "sharpening process" which will be described below.

The image data that has been subjected to image processing by the body controller 28 is stored in an image storage unit 29 which is, for example, a flash memory. The image data stored in the image storage unit 29 is transmitted to, for example, the computer 80 connected to the input/output interface 32 (see FIG. 1). In a case in which the image storage unit 29 is detachably and attachably provided in the camera body 14, the image data stored in the image storage unit 29 is transmitted to, for example, the computer 80 that is connected to the image storage unit 29 detached from the camera body 14. The format of the image data transmitted from the digital camera 10 (image storage unit 29) to, for example, the computer 80 is not particularly limited and may be any format such as a RAW format, a JPEG format, or a tagged image file format (TIFF). Therefore, the body controller 28 may associate a plurality of related data items, such as header information (imaging information (for example, an imaging date and time, the type of digital camera, the number of pixels, and a F number)), main image data, and thumbnail image data to form one image file, as in an exchangeable image file format (Exif), and may transmit the image file to the computer 80.

The computer 80 is connected to the digital camera 10 through the input/output interface 32 of the camera body 14 and a computer input/output unit 81 and receives data such as the image data transmitted from the camera body 14. A computer controller 82 controls the overall operation of the computer 80, performs imaging processing for the image data transmitted from the digital camera 10, or controls communication with, for example, a server 85 that is connected to the computer input/output unit 81 through a network 84 such as the Internet. The computer 80 includes a display 83. For example, the content of the process of the computer controller 82 is displayed on the display 83, if necessary. The user operates input means (not illustrated), such as a keyboard, to input data or commands to the computer controller 82, to control the computer 80, or to control devices (the digital camera 10 and the server 85) connected to the computer 80, while checking the content displayed on the display 83.

The server 85 includes a server input/output unit 86 and a server controller 87. The server input/output unit 86 is a transmission and reception connection unit with external apparatuses, such as the digital camera 10 or the computer 80, and is connected to the body controller 28 of the digital camera 10 or the computer input/output unit 81 of the computer 80 through the network 84. The server controller 87 has a function of transmitting and receiving data to and from the body controller 28 or the computer controller 82 if necessary, a function of downloading data to the digital camera 10 or the computer 80, or a function of performing arithmetic processing and transmitting the result of the arithmetic processing to the digital camera 10 or the computer 80, in cooperation with the body controller 28 or the computer controller 82 in response to a control instruction signal from the digital camera 10 or the computer 80.

Each controller (the lens unit controller 20, the body controller 28, the computer controller 82, and the server controller 87) comprises circuits required for a control process. Each controller comprises an arithmetic processing circuit (for example, a central processing unit (CPU)), a memory, or the like. In addition, a communication system between the digital camera 10, the computer 80, and the server 85 may be a wired communication system or a wireless communication system. The computer 80 and the server 85 may be integrally provided. The computer 80 and/or the server 85 may be omitted. The digital camera 10 may have a communication function with the server 85 and data may be directly transmitted and received between the digital camera 10 and the server 85.

Next, an image data sharpening process performed in the body controller 28 (image processing unit 36) illustrated in FIG. 2 will be described.

In the following description, image data before the sharpening process is referred to as "original image data" and image data after the sharpening process is referred to as "sharp image data".

An example in which the camera body 14 (body controller 28) performs the sharpening process will be described below. However, a portion of or the entire sharpening process may be performed by other controllers (for example, the lens unit controller 20, the computer controller 82, and the server controller 87). Hereinafter, the sharpening process performed by the image processing unit 36 will be described. As described above, the image processing unit 36 performs various types of image processing other than the sharpening process before and/or after the sharpening process. Processing units related to image processing other than the sharpening process which is performed by the image processing unit 36 will not be described and illustrated.

First Embodiment

Figure 3:
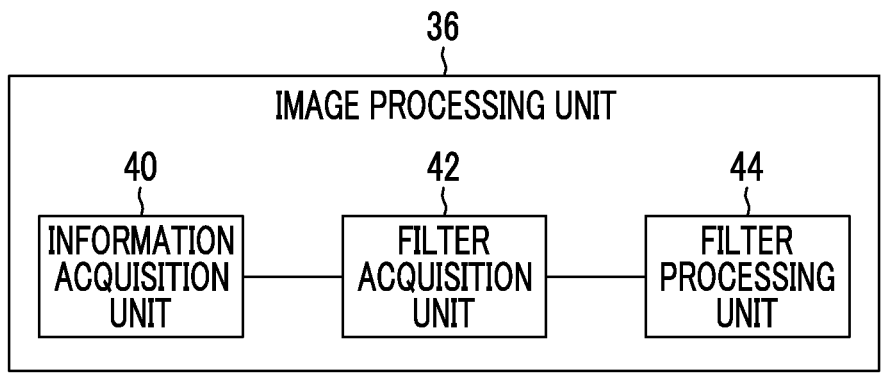
FIG. 3 is a block diagram illustrating an example of the functional structure of an image processing unit according to a first embodiment.

FIG. 3 is a block diagram illustrating an example of the functional structure of an image processing unit 36 according to a first embodiment.

In this example, the image processing unit 36 includes an information acquisition unit 40, a filter acquisition unit 42, and a filter processing unit 44.

The information acquisition unit 40 acquires imaging information of the original image data acquired by capturing an object image using the optical system (for example, the lens 16 and the diaphragm 17). A method for acquiring the imaging information using the information acquisition unit 40 is not particularly limited. For example, in a case in which the imaging information of the original image data is stored in a memory (not illustrated) provided in the image processing unit 36, the information acquisition unit 40 may access the memory and acquire the imaging information. In a case in which the imaging information is added as tag information (meta information) to the original image data, the information acquisition unit 40 may read the imaging information added to the original image data.

The filter acquisition unit 42 acquires a sharpening filter on the basis of the imaging information of the original image data acquired by the information acquisition unit 40. In particular, in this embodiment, the filter acquisition unit 42 acquires the sharpening filter on the basis of at least a F number or a focal length (a first imaging condition or a second imaging condition). An example in which a sharpening filter is specified by two imaging conditions, such as the "F number" and the "focal length", will be described below.

The filter processing unit 44 applies the sharpening filter acquired by the filter acquisition unit 42 to the original image data to acquire sharp image data.

<Sharpening Filter>

The sharpening filter is not particularly limited and may be a filter that is based on an optical transfer function of the optical system or a filter that is not based on the optical transfer function of the optical system. That is, a filter that is created on the basis of an optical transfer function (OTF) including a point spread function (PSF), a modulation transfer function (MTF), and a phase transfer function (PTF) may be used as the "sharpening filter". Alternatively, for example, a contour correction filter which is determined regardless of the optical transfer function may be used as the sharpening filter.

A method for acquiring the sharpening filter using the filter acquisition unit 42 is not particularly limited. For example, a sharpening filter may be selected from a plurality of sharpening filters which have been stored in advance on the basis of the imaging information of the original image data or a sharpening filter to be applied to the original image data may be created on the basis of the imaging information of the original image data.

Figure 4:
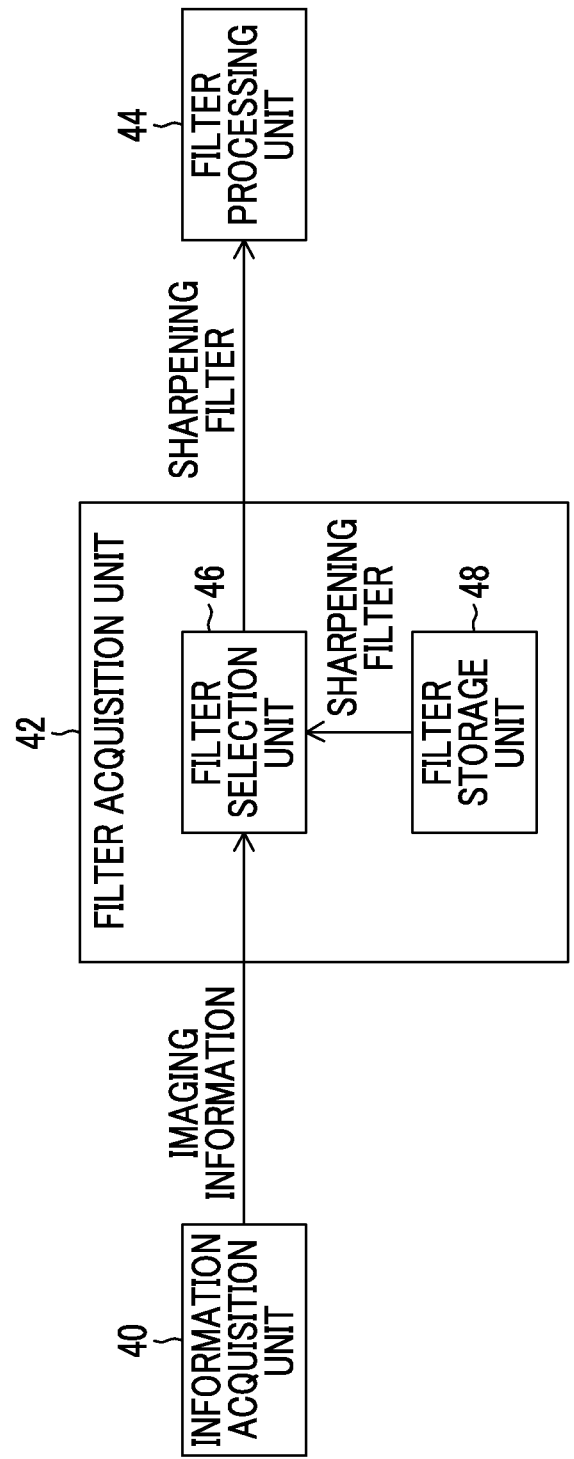
FIG. 4 is a block diagram illustrating an example of the functional structure of a filter acquisition unit.

FIG. 4 is a block diagram illustrating an example of the functional structure of the filter acquisition unit 42. In this example, the filter acquisition unit 42 includes a filter selection unit 46 and a filter storage unit 48. The filter storage unit 48 stores a plurality of sharpening filters which are determined according to at least the F number or the focal length (the first imaging condition or the second imaging condition). The filter selection unit 46 selects a sharpening filter from the plurality of sharpening filters stored in the filter storage unit 48, on the basis of the imaging information of the original image data transmitted from the information acquisition unit 40, and transmits the sharpening filter to the filter processing unit 44.

It is preferable that the plurality of sharpening filters stored in the filter storage unit 48 are filters corresponding to optical characteristics, such as the optical transfer function of the optical system (for example, the lens 16 and the diaphragm 17) used to capture and acquire the original image data. However, the plurality of sharpening filters do not necessarily correspond to the optical characteristics of the optical system. For example, sharpening filters that can be used for a plurality of types of optical systems, such as contour correction filters with high versatility, may be stored in the filter storage unit 48. The sharpening filter with high versatility can be used in a sharpening process for the original image data captured and acquired using the lens unit 12 which does not formally correspond to the camera body 14.

Figure 5:
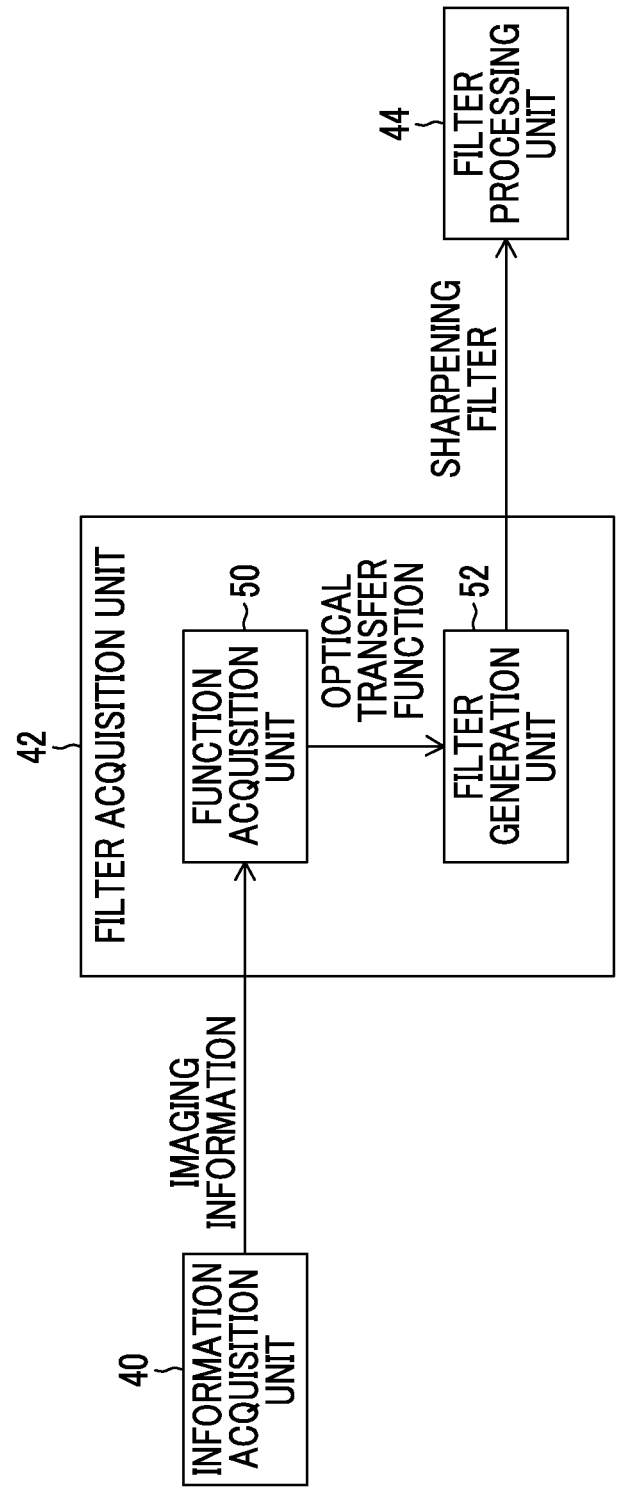
FIG. 5 is a block diagram illustrating another example of the functional structure of the filter acquisition unit.

FIG. 5 is a block diagram illustrating another example of the functional structure of the filter acquisition unit 42. In this example, the filter acquisition unit 42 includes a function acquisition unit 50 and a filter generation unit 52. The function acquisition unit 50 acquires imaging information including a plurality of optical transfer functions which are determined according to at least the F number or the focal length (the first imaging condition or the second imaging condition) from the information acquisition unit 40. The filter generation unit 52 generates a sharpening filter from an optical transfer function which is selected from the plurality of optical transfer functions acquired by the function acquisition unit 50 and is based on the imaging information (for example, the F number and the focal length) of the original image data and acquires the sharpening filter. Then, the sharpening filter generated by the filter generation unit 52 is transmitted to the filter processing unit 44.

A method for applying the sharpening filter to the original image data in the filter processing unit 44 is not particularly limited. For example, a sharpening filter common to all of the pixels of the original image data may be applied or the sharpening filter to be applied may vary depending on each pixel or each area of the original image data. In general, the optical transfer function is different at the center of the optical axis of the optical system and in the periphery of the optical system due to a difference in optical characteristics such as aberration. Therefore, the sharpening filter to be applied to each pixel or each area of the original image data may be changed depending on an image height. In this case, the filter acquisition unit 42 may acquire a plurality of sharpening filters associated with a plurality of image heights and the filter processing unit 44 may apply the plurality of sharpening filters acquired by the filter acquisition unit 42 to the original image data according to the image heights.

<For Method for Acquiring Sharpening Filter in a Case in Which It Is Difficult to Acquire Necessary Conditions>

For example, in a case in which the filter acquisition unit 42 stores a plurality of sharpening filters which are determined on the basis of the F number and the focal length as in the example illustrated in FIG. 4, the filter acquisition unit 42 can select and acquire an appropriate sharpening filter when the imaging information transmitted from the information acquisition unit 40 includes information about the F number and the focal length during the capture and acquisition of the original image data. In some cases, the filter acquisition unit 42 generates a sharpening filter from the optical transfer function, as in the example illustrated in FIG. 5. That is, in a case in which the filter acquisition unit 42 can store an appropriate sharpening filter which is determined on the basis of the F number and the focal length, the filter acquisition unit 42 can select and acquire an appropriate sharpening filter when the imaging information transmitted from the information acquisition unit 40 includes information about the F number and the focal length during the capture and acquisition of the original image data.

At that time, in some cases, the F number and/or the focal length is not included in the imaging information transmitted from the information acquisition unit 40 to the filter acquisition unit 42 or it is difficult for the information acquisition unit 40 to acquire the imaging information due to, for example, a communication failure. In these cases, it is difficult for the filter acquisition unit 42 to use the information about the F number and/or the focal length when the original image data is captured and acquired.

In this embodiment, in a case in which the imaging information acquired by the information acquisition unit 40 includes one (first imaging condition) of the F number and the focal length and does not include the other (second imaging condition), the filter acquisition unit 42 acquires a sharpening filter which is associated with the F number or the focal length (first imaging condition) included in the imaging information and is associated with a "representative condition" of the F number or the focal length (second imaging condition) that is not included in the imaging information.

That is, in a case in which it is difficult to use only a portion of basic information (imaging conditions) for selecting a sharpening filter in a situation in which a plurality of sharpening filters can be used, the "representative condition" is used for a shortage of the "basic information for selecting a sharpening filter". For example, in a case in which the imaging information transmitted from the information acquisition unit 40 to the filter acquisition unit 42 includes only information about the "F number" and does not include information about the "focal length", the filter acquisition unit 42 selects a plurality of sharpening filters associated with the information about the "F number" included in the imaging information from a plurality of available sharpening filters and selects a sharpening filter corresponding to the representative condition of the "focal length" from the selected plurality of sharpening filters. Similarly, for example, in a case in which the imaging information transmitted from the information acquisition unit 40 to the filter acquisition unit 42 includes only information about the "focal length" and does not include information about the "F number", the filter acquisition unit 42 selects a plurality of sharpening filters associated with the information about the "focal length" included in the imaging information from the plurality of available sharpening filters and selects a sharpening filter corresponding to the representative condition of the "F number" from the selected plurality of sharpening filters.

The "representative condition" of the F number or the focal length (second imaging condition) that is not included in the imaging information is determined from various points of view.

For example, the representative condition may be determined on the basis of the spatial frequency characteristics of each of a plurality of sharpening filters which are associated with the imaging condition (in this example, the F number or the focal length: the first imaging condition) included in the imaging information.

In this case, for example, for each of a plurality of sharpening filters which are associated with the imaging condition (the F number or the focal length: the first imaging condition) included in the imaging information and are associated with each of a plurality of "imaging conditions (the F number or the focal length: the second imaging condition) that are not included in the imaging information", the representative condition of the imaging condition (the F number or the focal length: the second imaging condition) that is not included in the imaging information may be determined on the basis of the maximum value of a response indicating the ratio of image data after the sharpening filter is applied to image data before the sharpening filter is applied for each spatial frequency.

Figure 6:
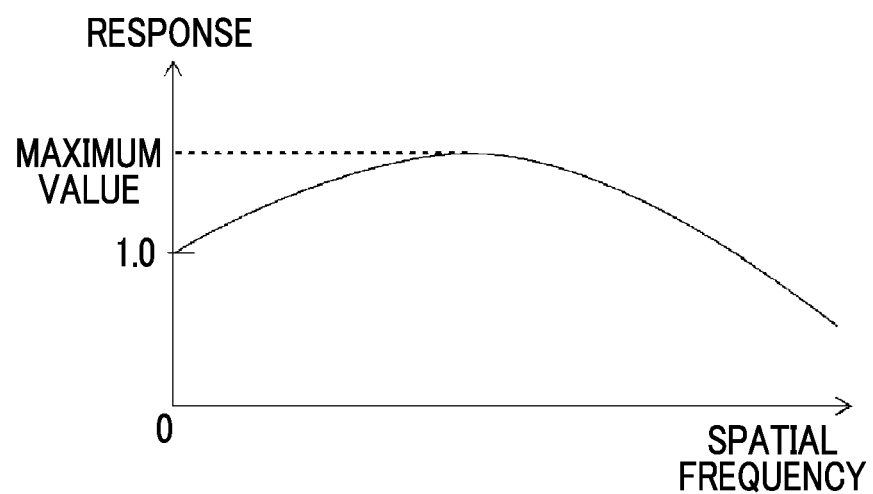
FIG. 6 is a diagram illustrating an example of the response of a sharpening filter for each spatial frequency.

FIG. 6 is a diagram illustrating an example of the response of the sharpening filter for each spatial frequency. In FIG. 6, the horizontal axis indicates a spatial frequency and the vertical axis indicates a "response=image data after the sharpening filter is applied/image data before the sharpening filter is applied". That is, the response indicates the ratio of image data after the sharpening filter is applied to image data before the sharpening filter is applied for each spatial frequency. Therefore, in image data, when "response=1.0" is established, the value of a spatial frequency component does not vary before and after the sharpening filter is applied. When "response >1.0" is satisfied, the value of a spatial frequency component after the sharpening filter is applied is greater than that before the sharpening filter is applied. When "response <1.0" satisfied, the value of a spatial frequency component after the sharpening filter is applied is less than that before the sharpening filter is applied. It is possible to determine the representative condition of the imaging condition (the F number or the focal length: the second imaging condition) that is not included in the imaging information, with reference to the maximum value of the response, on the basis of the "spatial frequency-response" characteristics.

For example, preferably, an imaging condition corresponding to a sharpening filter in which the degree of change in image quality is the smallest is used as the representative condition in order to prevent the sharpening process from causing the deterioration of image quality. Therefore, since a sharpening filter with the smallest maximum value of the response among a plurality of sharpening filters associated with the imaging condition (the F number or the focal length: the first imaging condition) that is included in the imaging information is used as the representative filter, the "imaging condition (the F number or the focal length: the second imaging condition) that is not included in the imaging information" which corresponds to the "sharpening filter with the smallest maximum value of the response" may be used as the representative condition.

Preferably, an imaging condition corresponding to a sharpening filter in which the degree of change in image quality is the smallest is used as the representative condition in order to maximize the sharpening effect of the sharpening process. Therefore, since a sharpening filter with the largest maximum value of the response among the plurality of sharpening filters associated with the imaging condition (the F number or the focal length: the first imaging condition) that is included in the imaging information is used as the representative filter, the "imaging condition (the F number or the focal length: the second imaging condition) that is not included in the imaging information" which corresponds to the "sharpening filter with the largest maximum value of the response" may be used as the representative condition.

Preferably, an imaging condition corresponding to a moderate sharpening filter in which the degree of change in image quality is average is used as the representative condition in order to balance the avoidance of the deterioration of image quality due to the sharpening process and the ensuring of the sharpening effect. Therefore, since a sharpening filter with the median of the maximum value of the response among a plurality of sharpening filters associated with the imaging condition (the F number or the focal length: the first imaging condition) that is included in the imaging information is used as the representative filter, the "imaging condition (the F number or the focal length: the second imaging condition) that is not included in the imaging information" which corresponds to the "sharpening filter with the median of the maximum value of the response" may be used as the representative condition.

The "imaging condition (the F number or the focal length: the second imaging condition) that is not included in the imaging information" may be determined on the basis of information other than the maximum value of the response of the sharpening filter.

Figure 7:
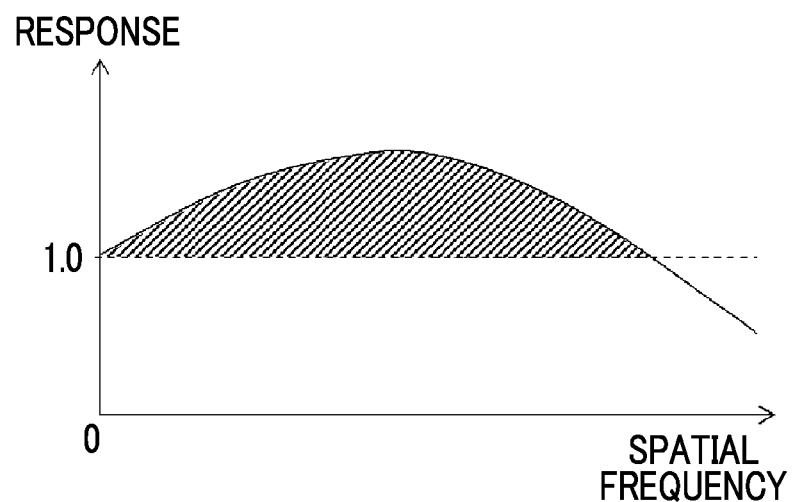
FIG. 7 is a diagram illustrating an example of the response of the sharpening filter for each spatial frequency.

FIG. 7 is a diagram illustrating an example of the response of the sharpening filter for each spatial frequency. In FIG. 7, the horizontal axis and the vertical axis indicate the same content as that in FIG. 6. That is, the horizontal axis indicates a spatial frequency and the vertical axis indicates a "response=image data after the sharpening filter is applied/image data before the sharpening filter is applied".

For each of a plurality of sharpening filters which are associated with the imaging condition (the F number or the focal length: the first imaging condition) included in the imaging information and are associated with a plurality of imaging conditions (the F number or the focal length: the second imaging condition) that are not included in the imaging information, the representative condition of the imaging condition (the F number or the focal length: the second imaging condition) that is not included in the imaging information may be determined on the basis of the area of a range indicating the response that is greater than a "first threshold value" in a "spatial frequency-response" coordinate system illustrated in FIG. 7. The "first threshold value" is preferably equal to or greater than 1. In FIG. 7, a hatched portion indicates a range in which the "response the first threshold value (=1.0)" is satisfied in a case in which the "first threshold value is 1.0".

For example, preferably, a sharpening filter which causes the area of the range indicating the response that is greater than the "first threshold value" in the "spatial frequency-response" coordinate system to be the smallest among a plurality of sharpening filters associated with the imaging condition (the F number or the focal length: the first imaging condition) that is included in the imaging information is used as the representative condition in order to prevent the sharpening process from causing the deterioration of image quality. Therefore, the "imaging condition (the F number or the focal length: the second imaging condition) that is not included in the imaging information" corresponding to the "sharpening filter which causes the area of the range indicating the response that is greater than the first threshold value in the spatial frequency-response coordinate system to be the smallest" may be used as the representative condition.

Preferably, a sharpening filter which causes the area of the range indicating the response that is greater than the "first threshold value" in the "spatial frequency-response" coordinate system to be the largest among the plurality of sharpening filters associated with the imaging condition (the F number or the focal length: the first imaging condition) that is included in the imaging information is used as the representative condition in order to maximize the sharpening effect of the sharpening process. Therefore, the "imaging condition (the F number or the focal length: the second imaging condition) that is not included in the imaging information" corresponding to the "sharpening filter which causes the area of the range indicating the response that is greater than the first threshold value in the spatial frequency-response coordinate system to be the largest" may be used as the representative condition.

Preferably, a sharpening filter which causes the area of the range indicating the response that is greater than the "first threshold value" in the "spatial frequency-response" coordinate system to be the median among the plurality of sharpening filters associated with the imaging condition (the F number or the focal length: the first imaging condition) that is included in the imaging information is used as the representative condition in order to balance the avoidance of the deterioration of image quality due to the sharpening process and the ensuring of the sharpening effect. Therefore, the "imaging condition (the F number or the focal length: the second imaging condition) that is not included in the imaging information" corresponding to the "sharpening filter which causes the area of the range indicating the response that is greater than the first threshold value in the spatial frequency-response coordinate system to be the median" may be used as the representative condition.

The "representative condition of the imaging condition (the F number or the focal length: the second imaging condition) that is not included in the imaging information" may be determined on other kinds of information. For example, the "representative condition of the imaging condition (the F number or the focal length: the second imaging condition) that is not included in the imaging information" may be determined on the basis of information such as the frequency of use. For example, a "condition that is frequently used" which is calculated from statistical information may be used as the "representative condition of the imaging condition (the F number or the focal length: the second imaging condition) that is not included in the imaging information". For example, in a case in which the "imaging condition that is not included in the imaging information" is the focal length, the minimum focal length or the maximum focal length may be used as the "representative condition". In addition, in a case in which the "imaging condition that is not included in the imaging information" is the F number, a diaphragm that is frequently used may be calculated in advance and a F number which is calculated in advance may be used as the representative condition.

Next, the flow of the sharpening process will be described.

Figure 8:
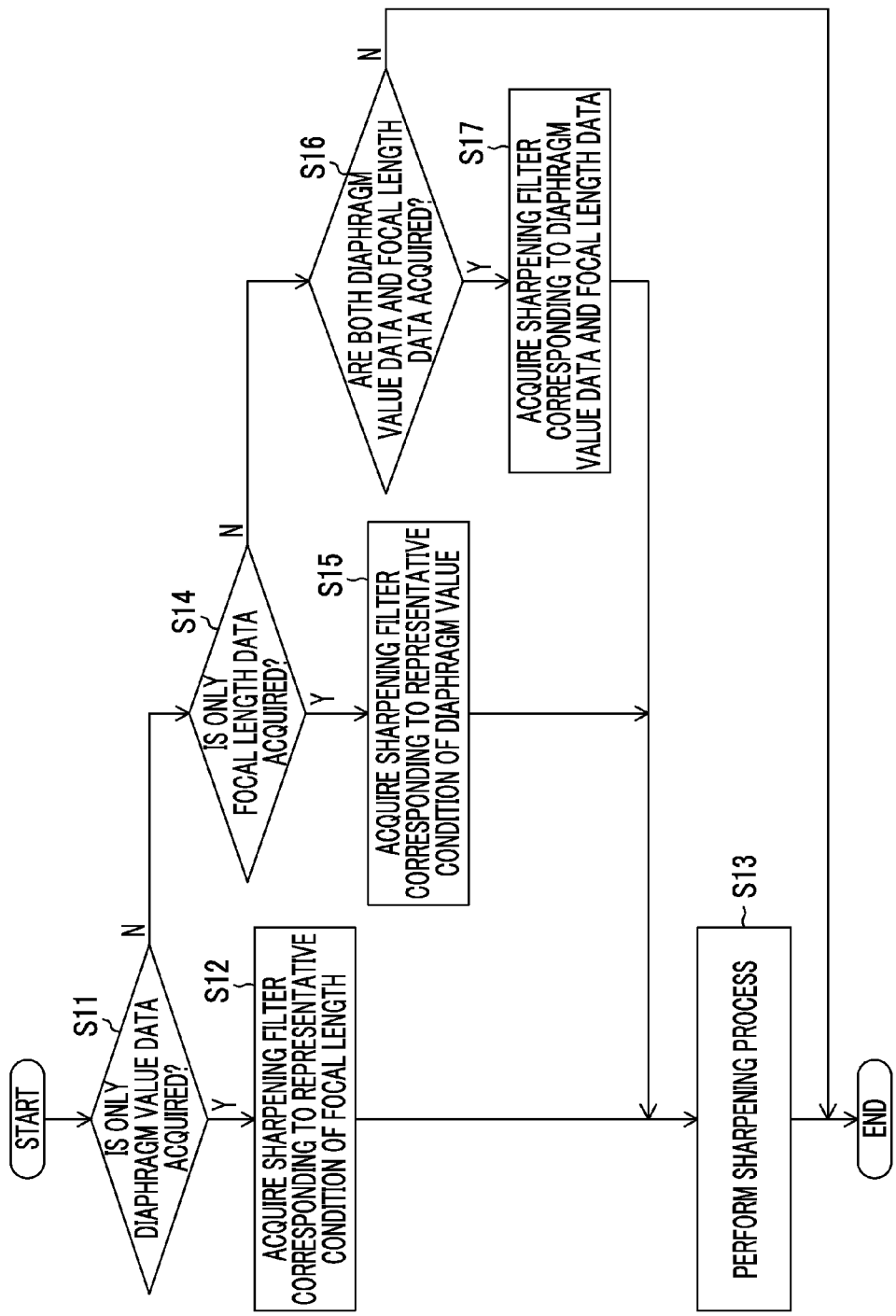
FIG. 8 is a flowchart illustrating an example of the flow of a sharpening process.

FIG. 8 is a flowchart illustrating an example of the flow of the sharpening process.

First, the information acquisition unit 40 acquires the imaging information of the original image data and the filter acquisition unit 42 determines whether data for the F number and the focal length when the original image data is captured and acquired is included in the acquired imaging information.

In a case in which the imaging information includes only data for the F number and does not include data for the focal length (Y in S11 of FIG. 8), the filter acquisition unit 42 acquires the "data for the F number included in the imaging information" and a sharpening filter corresponding to the "representative condition of the focal length" (S12). On the other hand, in a case in which the imaging information includes only the data for the focal length and does not include the data for the F number (N in S11 and Y in S14), the filter acquisition unit 42 acquires the "data for the focal length included in the imaging information" and a sharpening filter corresponding to the "representative condition of the F number" (S15). In a case in which the imaging information includes both the data for the F number and the data for the focal length (N S14 and Y in S16), the filter acquisition unit 42 acquires a sharpening filter corresponding to the "data for the F number and the focal length included in the imaging information" (S17).

Then, the filter processing unit 44 performs the sharpening process for the original image data, using the sharpening filter acquired by the filter acquisition unit 42, and acquires the sharp image data (S13).

In this example, in a case in which the imaging information includes neither the data for the F number nor the data for the focal length or in a case in which the information acquisition unit 40 is not capable of acquiring the imaging information (N in S16), the sharpening process (S13) is skipped and is not performed. However, in this case (N in S16), the sharpening process may not be skipped and may be performed using the sharpening filters corresponding to the representative condition of each of a predetermined F number and a predetermined focal length.

As described above, according to this embodiment, even in a case in which it is difficult to acquire some of the condition (the F number and the focal length) for specifying the sharpening filter, it is possible to select a sharpening filter on the basis of the representative condition and to perform the sharpening process with high accuracy.

Second Embodiment

In this embodiment, the detailed description of the same or similar structures and operations as those in the first embodiment will not be repeated.

In this embodiment, in a case in which defects are likely to occur due to a sharpening process or in a case in which defects occur due to the sharpening process, a change in image quality due to the sharpening process is prevented. As a method for preventing a change in image quality due to the sharpening process, for example, there is a method in which the filter processing unit 44 performs the sharpening process using a sharpening filter having a smaller sharpening effect than the sharpening filter that is originally used. In addition, there is a method in which the filter processing unit 44 controls the gain to reduce an increment in the sharp image data with respect to the original image data.

Figure 9:
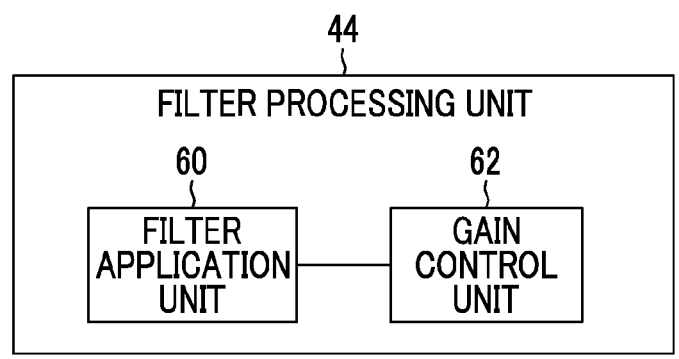
FIG. 9 is a block diagram illustrating an example of the functional structure of a filter processing unit.

FIG. 9 is a block diagram illustrating an example of the functional structure of the filter processing unit 44. In this example, the filter processing unit 44 includes a filter application unit 60 and a gain control unit 62. The filter application unit 60 applies the sharpening filter acquired by the filter acquisition unit 42 to the original image data to acquire filtering image data. The gain control unit 62 controls the gain of the filtering image data with respect to the original image data, on the basis of the imaging information acquired by the information acquisition unit 40, and acquires the sharp image data.

Figure 10:
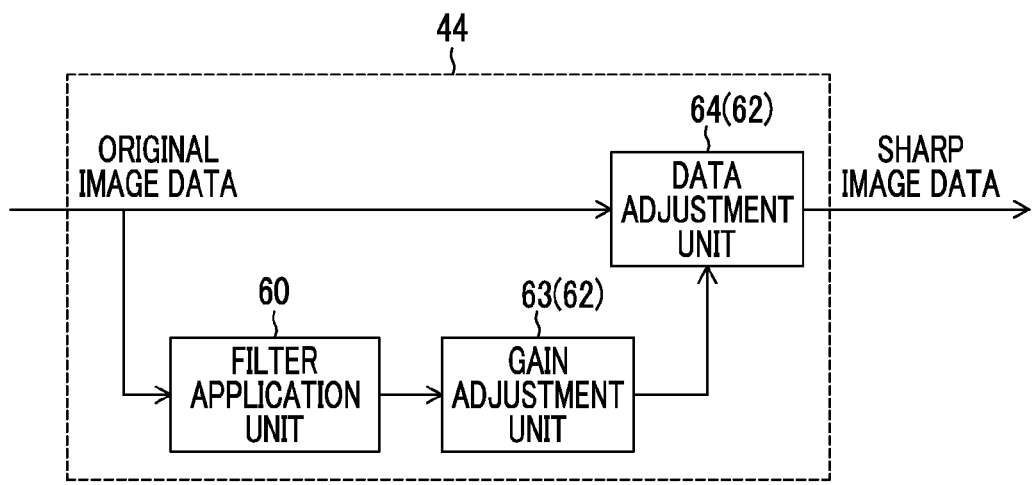
FIG. 10 is a block diagram illustrating a detailed example of the functional structure of the filter processing unit.

A detailed sharpening filter application method or a detailed gain control method is not particularly limited and any method can be used to acquire the sharp image data from the original image data. FIG. 10 is a block diagram illustrating a detailed example of the functional structure of the filter processing unit 44. In the example illustrated in FIG. 10, the filter processing unit 44 includes the filter application unit 60, a gain adjustment unit 63, and a data adjustment unit 64 (gain control unit 62). In this example, the gain adjustment unit 63 multiplies the "filtering image data obtained by applying the sharpening filter to the original image data" acquired by the filter application unit 60 by a restoration strength multiplying factor U to acquire first adjusted image data. The data adjustment unit 64 multiplies the "original image data" before the sharpening filter is applied by the filter application unit 60 by a multiplying factor (1−U) to acquire second adjusted image data. Then, the data adjustment unit 64 adds the second adjusted image data and the first adjusted image data acquired by the gain adjustment unit 63 to acquire the sharp image data.

The filter processing unit 44 may use other methods equivalent to the above-mentioned method, instead of the above-mentioned method. For example, after acquiring the "filtering image data obtained by applying the sharpening filter to the original image data", the filter application unit 60 may calculate increment/decrement data for an image and the gain adjustment unit 63 may multiply the increment/decrement data by the restoration strength multiplying factor U to perform gain control. In this case, the data adjustment unit 64 adds the "original image data" before the sharpening filter is applied by the filter application unit 60 and the "increment/decrement data multiplied by the restoration strength multiplying factor U" acquired by the gain adjustment unit 63 to acquire the sharp image data.

In the "case in which defects are likely to occur due to the sharpening process or in the case in which defects occur due to the sharpening process", the filter application unit 60 uses a sharpening filter having a small sharpening effect or the gain control unit 62 adjusts gain control to reduce the sharpening effect, thereby preventing a change in image quality due to the sharpening process.

The "case in which defects are likely to occur due to the sharpening process or the case in which defects occur due to the sharpening process" is not particularly limited. The detailed cases will be described in each of the following modes.

<First Mode>

In this mode, when the "case in which defects are likely to occur due to the sharpening process" is determined on the basis of the number of components of the original image data in a specific spatial frequency range, a change in image quality due to the sharpening process is prevented. Preferably, the "specific spatial frequency range" includes a spatial frequency range in which data is changed by the sharpening filter and is included in, for example, a range that is equal to or greater than one eighth of a sampling frequency of the original image data and is equal to or less than one fourth of the sampling frequency.

In this example, in a case in which the number of components of the original image data in a "specific spatial frequency range" including the spatial frequency range in which data is changed by the sharpening filter is large (that is, in a case in which the number of components is equal to or greater than a second threshold value), a change in image quality due to the sharpening process is prevented.

Figure 11:
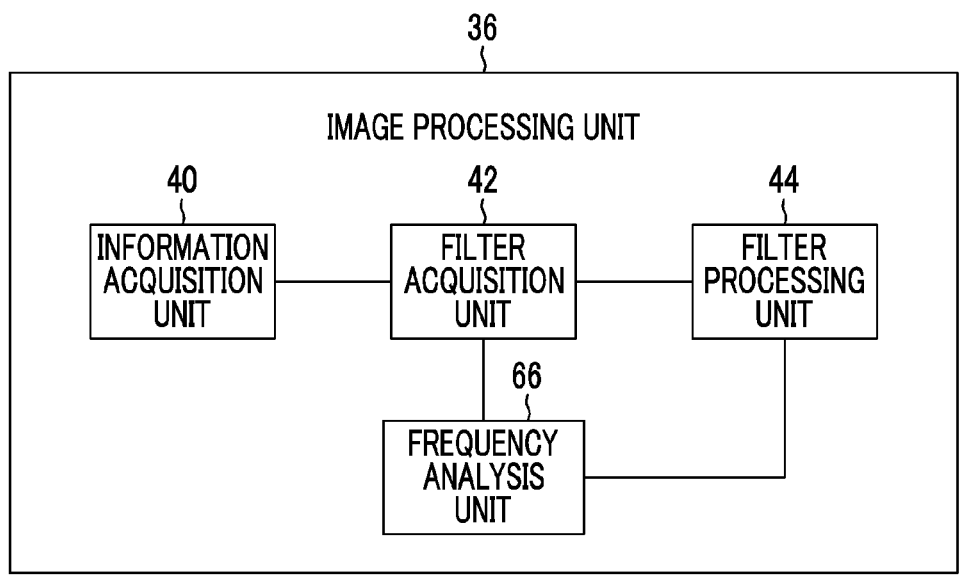
FIG. 11 is a block diagram illustrating an example of the functional structure of an image processing unit according to a first mode of a second embodiment.

FIG. 11 is a block diagram illustrating an example of the functional structure of an image processing unit 36 according to the first mode. In this example, the image processing unit 36 comprises a frequency analysis unit 66 that analyzes the spatial frequency characteristics of the original image data, in addition to the information acquisition unit 40, the filter acquisition unit 42, and the filter processing unit 44. Data for the spatial frequency characteristics of the original image data analyzed by the frequency analysis unit 66 is transmitted to the filter acquisition unit 42 and the filter processing unit 44.

The filter acquisition unit 42 determines whether the number of components of the original image data in a specific spatial frequency range is equal to or greater than the second threshold value, on the basis of the analysis result of the frequency analysis unit 66. In a case in which it is determined that the number of components of the original image data in a specific spatial frequency range is less than the second threshold value, the filter acquisition unit 42 acquires a sharpening filter using a general process. On the other hand, in a case in which it is determined that the number of components of the original image data in a specific spatial frequency range is equal to or greater than the second threshold value, the filter acquisition unit 42 may acquire a sharpening filter having a response which indicates the ratio of image data after the sharpening filter is applied to image data before the sharpening filter is applied for each spatial frequency and is lower than that of the sharpening filter associated with the representative condition of the imaging condition (the F number or the focal length: the second imaging condition) that is not included in the imaging information acquired by the information acquisition unit 40.

The gain control of the filter processing unit 44 may be adjusted, instead of the filter acquisition process of the filter acquisition unit 42 or in addition to the filter acquisition process of the filter acquisition unit 42. That is, the gain control unit 62 (see FIGS. 9 and 10) of the filter processing unit 44 determines whether the number of components of the original image data in a specific spatial frequency range is equal to or greater than the second threshold value on the basis of the analysis result of the frequency analysis unit 66. In a case in which it is determined that the number of components of the original image data in a specific spatial frequency range is less than the second threshold value, the gain control unit 62 performs a general gain control process. On the other hand, in a case in which it is determined that the number of components of the original image data in a specific spatial frequency range is equal to or greater than the second threshold value, the gain control unit 62 controls the gain such that an increment in the sharp image data with respect to the original image data is less than that in a case in which the gain is controlled on the basis of the imaging information acquired by the information acquisition unit 40.

<Second Mode>

In this mode, a case in which the original image data includes a saturated pixel is determined to be the "case in which defects are likely to occur due to the sharpening process" and a change in image quality due to the sharpening process is prevented. The "saturated pixel" is a pixel with a large pixel value and a pixel with a pixel value that is likely to be the maximum value by the sharpening process. For example, a pixel with a pixel value that is equal to or greater than 90% of the pixel value that can be represented can be used as the "saturated pixel". In a case in which the pixel value can be represented by "0 to 255", for example, a pixel having a pixel value of "230 to 255" may be treated as the saturated pixel.

Figure 12:
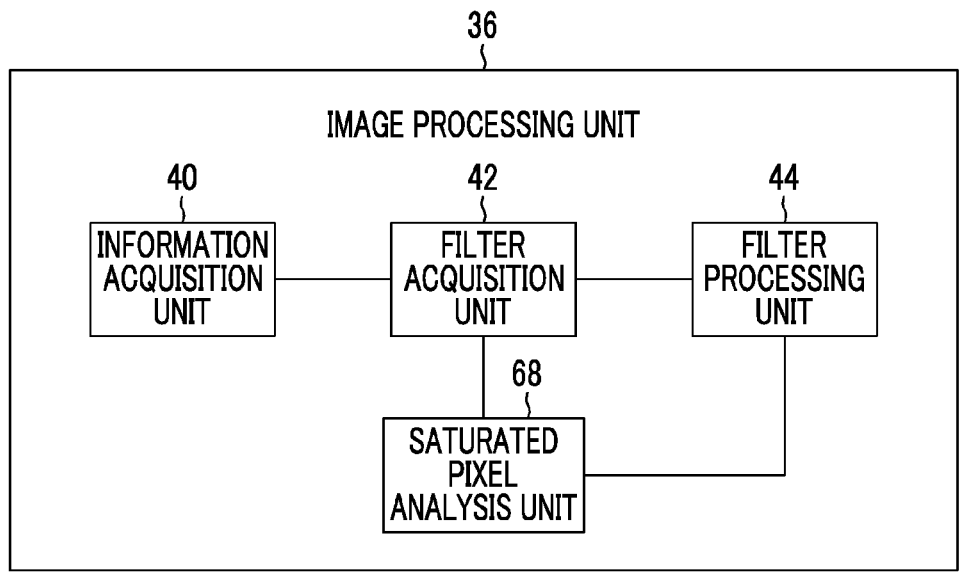
FIG. 12 is a block diagram illustrating an example of the functional structure of an image processing unit according to a second mode of the second embodiment.

FIG. 12 is a block diagram illustrating an example of the functional structure of an image processing unit 36 according to the second mode. In this example, the image processing unit 36 comprises a saturated pixel analysis unit 68 that analyzes the saturated pixel of the original image data, in addition to the information acquisition unit 40, the filter acquisition unit 42, and the filter processing unit 44. Data for the saturated pixel of the original image data analyzed by the saturated pixel analysis unit 68 is transmitted to the filter acquisition unit 42 and the filter processing unit 44.

The filter acquisition unit 42 determines whether the original image data includes a saturated pixel with a pixel value that is equal to or greater than a third threshold value (for example, "233"), on the basis of the analysis result of the saturated pixel analysis unit 68. In a case in which it is determined that the original image data does not include the saturated pixel with a pixel value that is equal to or greater than the third threshold value, the filter acquisition unit 42 acquires a sharpening filter using a general process. On the other hand, in a case in which it is determined that the original image data includes the saturated pixel with a pixel value that is equal to or greater than the third threshold value, the filter acquisition unit 42 may acquire a sharpening filter having a response which indicates the ratio of image data after the sharpening filter is applied to image data before the sharpening filter is applied for each spatial frequency and is less than that of the sharpening filter associated with the representative condition of the imaging condition (the F number or the focal length: the second imaging condition) that is not included in the imaging information acquired by the information acquisition unit 40.

The gain control of the filter processing unit 44 may be adjusted, instead of the filter acquisition process of the filter acquisition unit 42 or in addition to the filter acquisition process of the filter acquisition unit 42. That is, the gain control unit 62 (see FIGS. 9 and 10) of the filter processing unit 44 determines whether the original image data includes a saturated pixel with a pixel value that is equal to or greater than the third threshold value on the basis of the analysis result of the saturated pixel analysis unit 68. In a case in which the original image data does not include the saturated pixel with a pixel value that is equal to or greater than the third threshold value, the gain control unit 62 performs a general gain control process. On the other hand, in a case in which it is determined that the original image data includes the saturated pixel with a pixel value that is equal to or greater than the third threshold value, the gain control unit 62 controls the gain such that an increment in the sharp image data with respect to the original image data is less than that in a case in which the gain is controlled on the basis of the imaging information acquired by the information acquisition unit 40.

<Third Mode>

In this mode, a case in which ringing is likely to occur in the image data (sharp image data) subjected to the sharpening process or a case in which ringing occurs in the image data subjected to the sharpening process is determined to be the "case in which defects are likely to occur due to the sharpening process or the case in which defects occur due to the sharpening process" and a change in image quality due to the sharpening process is prevented.

Figure 13:
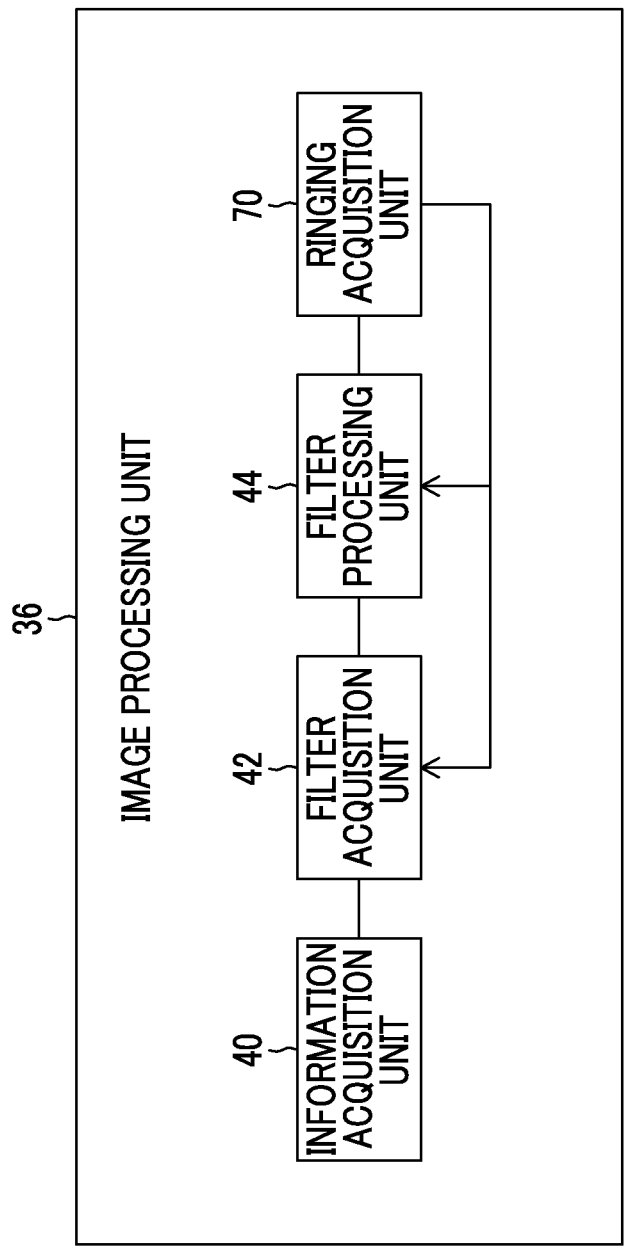
FIG. 13 is a block diagram illustrating an example of the functional structure of an image processing unit according to a third mode of the second embodiment.

FIG. 13 is a block diagram illustrating an example of the functional structure of an image processing unit 36 according to the third mode. In this example, the image processing unit 36 comprises a ringing acquisition unit 70 that acquires the amount of ringing of the sharp image data, in addition to the information acquisition unit 40, the filter acquisition unit 42, and the filter processing unit 44. Data for the amount of ringing acquired by the ringing acquisition unit 70 is transmitted to the filter acquisition unit 42 and the filter processing unit 44.

A method for acquiring the amount of ringing is not particularly limited. The ringing acquisition unit 70 may acquire the amount of ringing on the basis of, for example, predetermined conditions. For example, the ringing acquisition unit 70 may compare the original image data with the sharp image data to acquire the amount of ringing. Alternatively, the ringing acquisition unit 70 may analyze image characteristics, such as frequency characteristics of the sharp image data, and acquire (estimate) the amount of ringing according to whether the analysis result corresponds to predetermined conditions. The ringing acquisition unit 70 may acquire (estimate) the amount of ringing according to whether the original image data is acquired under predetermined acquisition conditions. For example, information about the optical system used for an imaging operation for acquiring the original image data is included in the acquisition conditions. Various factors that affect the accuracy or adverse effect (for example, ringing) of the sharpening process are included in the "acquisition conditions". For example, the information about the optical system includes at least one of the lens type, F number, and zoom value of the optical system used for the imaging operation for acquiring the original image data. The ringing acquisition unit 70 may analyze image characteristics, such as the frequency characteristics of the sharp image data, and acquire (estimate) the amount of ringing according to whether the analysis result corresponds to predetermined conditions. For example, the ringing acquisition unit 70 may acquire (estimate) the amount of ringing according to whether a saturated pixel is present in the original image data.

Next, an example in which the ringing acquisition unit 70 compares the original image data with the sharp image data to acquire the amount of ringing will be described.

The filter acquisition unit 42 determines whether the amount of ringing is equal to or greater than a fourth threshold value on the basis of the analysis result of the ringing acquisition unit 70. In a case in which it is determined that the amount of ringing is less than the fourth threshold value, the sharpening process is not performed again and the sharp image data which has been subjected to the sharpening process by the filter processing unit 44 is output from the ringing acquisition unit 70. On the other hand, in a case in which it is determined that the amount of ringing is equal to or greater than the fourth threshold value, the sharpening process is performed again.

For example, in a case in which it is determined that the amount of ringing is equal to or greater than the fourth threshold value, the filter acquisition unit 42 may acquire a sharpening filter having a response which indicates the ratio of image data after the sharpening filter is applied to image data before the sharpening filter is applied for each spatial frequency and is less than that of the sharpening filter associated with the representative condition of the imaging condition (the F number or the focal length: the second imaging condition) that is not included in the imaging information acquired by the information acquisition unit 40.

The gain control of the filter processing unit 44 may be adjusted, instead of the filter acquisition process of the filter acquisition unit 42 or in addition to the filter acquisition process of the filter acquisition unit 42. That is, in a case in which it is determined that the amount of ringing is equal to or greater than the fourth threshold value, the gain control unit 62 (see FIGS. 9 and 10) of the filter processing unit 44 controls the gain such that an increment in the sharp image data with respect to the original image data is less than that in a case in which the gain is controlled on the basis of the imaging information acquired by the information acquisition unit 40.

<Fourth Mode>

In this mode, a case in which an "increment in the sharp image data with respect to the original image data" in a specific spatial frequency is large due to the sharpening process is determined to be the "case in which defects are likely to occur due to the sharpening process or the case in which defects occur due to the sharpening process" and a change in image quality due to the sharpening process is prevented. Preferably, the "specific spatial frequency range" includes a spatial frequency range in which data is changed by the sharpening filter and is included in, for example, a range that is equal to or greater than one eighth of the sampling frequency of the original image data and is equal to or less than one fourth of the sampling frequency.

Figure 14:
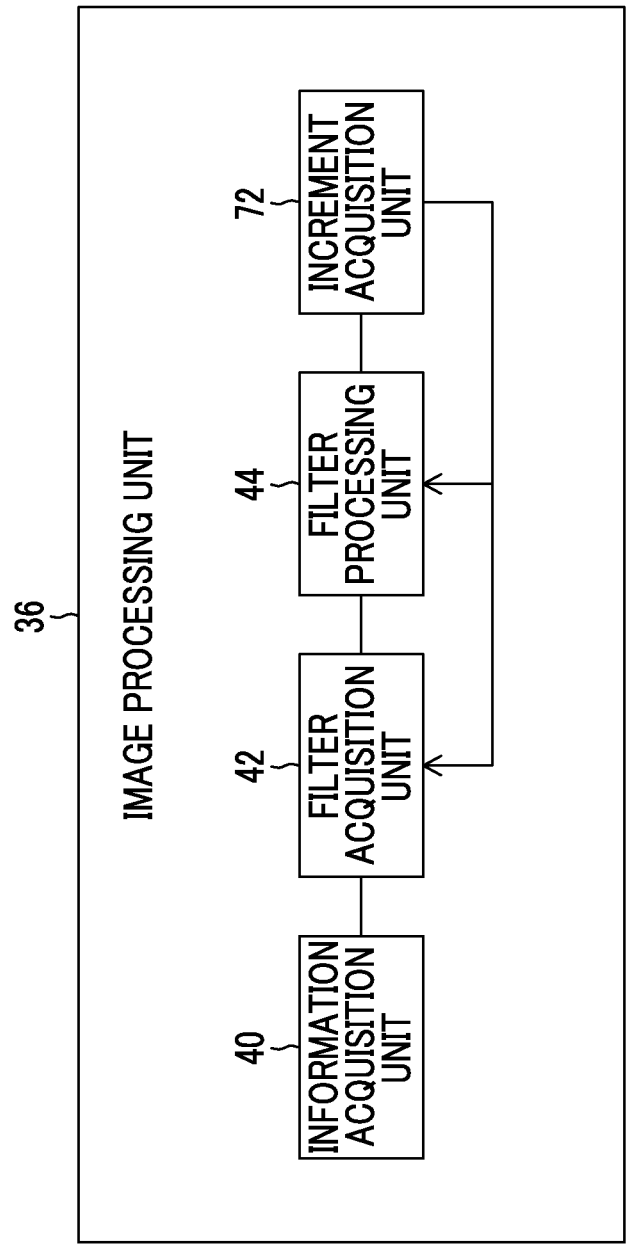
FIG. 14 is a block diagram illustrating an example of the functional structure of an image processing unit according to a fourth mode of the second embodiment.

FIG. 14 is a block diagram illustrating an example of the functional structure of an image processing unit 36 according to a fourth mode. In this example, the image processing unit 36 includes an increment acquisition unit 72 that acquires an increment in the sharp image data with respect to the original image data in a specific spatial frequency range, in addition to the information acquisition unit 40, the filter acquisition unit 42, and the filter processing unit 44. Data for the increment acquired by the increment acquisition unit 72 is transmitted to the filter acquisition unit 42 and the filter processing unit 44.

The filter acquisition unit 42 determines whether an increment in the sharp image data with respect to the original image data in a specific spatial frequency range is equal to or greater than a fifth threshold value on the basis of the processing result of the increment acquisition unit 72. In a case in which it is determined that the increment is less than the fifth threshold value, the sharpening process is not performed again and the sharp image data which has been subjected to the sharpening process by the filter processing unit 44 is output from the increment acquisition unit 72. On the other hand, in a case in which it is determined that the increment is equal to or greater than the fifth threshold value, the sharpening process is performed again.

For example, in a case in which it is determined that the increment is equal to or greater than the fifth threshold value, the filter acquisition unit 42 may acquire a sharpening filter having a response which indicates the ratio of image data after the sharpening filter is applied to image data before the sharpening filter is applied for each spatial frequency and is lower than that of the sharpening filter associated with the representative condition of the imaging condition (the F number or the focal length: the second imaging condition) that is not included in the imaging information acquired by the information acquisition unit 40.

The gain control of the filter processing unit 44 may be adjusted, instead of the filter acquisition process of the filter acquisition unit 42 or in addition to the filter acquisition process of the filter acquisition unit 42. That is, in a case in which it is determined that the increment is equal to or greater than the fifth threshold value, the gain control unit 62 (see FIGS. 9 and 10) of the filter processing unit 44 controls the gain such that an increment in the sharp image data with respect to the original image data is less than that in a case in which the gain is controlled on the basis of the imaging information acquired by the information acquisition unit 40.

Other Modification Examples

Among the above-described embodiments and modification examples, arbitrary embodiments and modification examples may be combined with each other. The above-described embodiments are illustrative and the invention may be applied to other structures.

In the above-described embodiments, the sharpening filter is specified on the basis of the information of the F number and the focal length. However, the sharpening filter may be specified on the basis of other imaging conditions (for example, an object distance and brightness (exposure, a histogram, and the degree of saturation)). In this case, the same operation and effect as described above can be obtained.

Each of the above-mentioned functional structures can be implemented by arbitrary hardware, software, or a combination thereof. For example, the invention can be applied to a program that causes a computer to perform an image processing method (image processing procedure) in each of the above-mentioned apparatuses and the processing units (for example, the image processing unit 36), a computer-readable storage medium (non-transitory storage medium) storing the program, or a computer in which the program can be installed.

<Application Example to EDoF System>

The sharpening process according to the above-described embodiments includes a restoration process considering an optical transfer function. The restoration process is image processing for recovering and correcting point spread (point image blur) according to information about specific imaging conditions (for example, a F number, a focal length, a lens type, and a zoom magnification) to restore the original object image. The sharpening process to which the invention can be applied is not limited to the restoration process in the above-described embodiments. For example, the restoration process according to the invention can also be applied to a restoration process for image data which has been captured and acquired by an optical system (for example, an imaging lens) having an extended depth of field (focus) (EDoF). The restoration process is performed for the image data of a blurred image which is captured and acquired by the EDoF optical system in a state in which the depth of field (depth of focus) is extended to restore and generate high-resolution image data which is in focus in a wide range. In this case, the restoration process is performed using a restoration filter which is based on the optical transfer function (for example, PSF, OTF, MTF, or PTF) of the EDoF optical system and which has a filter coefficient set such that appropriate image restoration can be performed within the range of the extended depth of field (depth of focus).

Hereinafter, an example of a system (EDoF system) related to the restoration of the image data which is captured and acquired by the EDoF optical system will be described. In the following example, the restoration process is performed for a brightness signal (Y data) obtained from the image data (RGB data) after a demosaicing process. The time when the restoration process is performed is not particularly limited. For example, the restoration process may be performed for "image data (mosaic image data) before the demosaicing process" or "image data (demosaic image data) after the demosaicing process and before a brightness signal conversion process".

Figure 15:
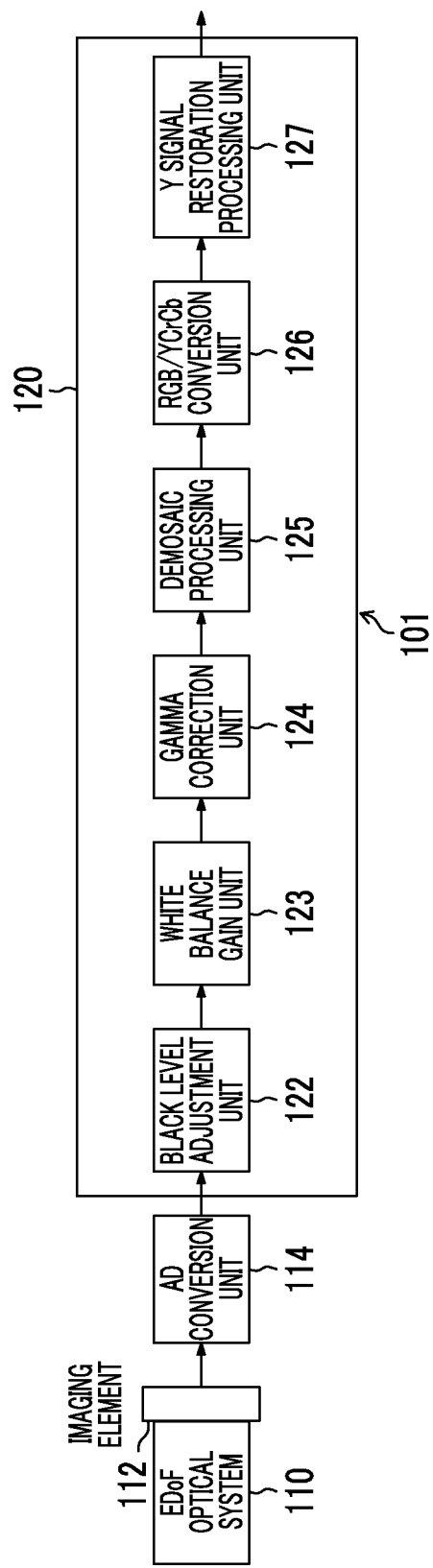
FIG. 15 is a block diagram illustrating an example of an imaging module comprising an EDoF optical system.

FIG. 15 is a block diagram illustrating an example of an imaging module 101 including the EDoF optical system. The imaging module 101 (for example, a digital camera) according to this example includes an EDoF optical system (lens unit) 110, an imaging element 112, an AD conversion unit 114, and a restoration processing block (the image processing unit 36) 120.

Figure 16:
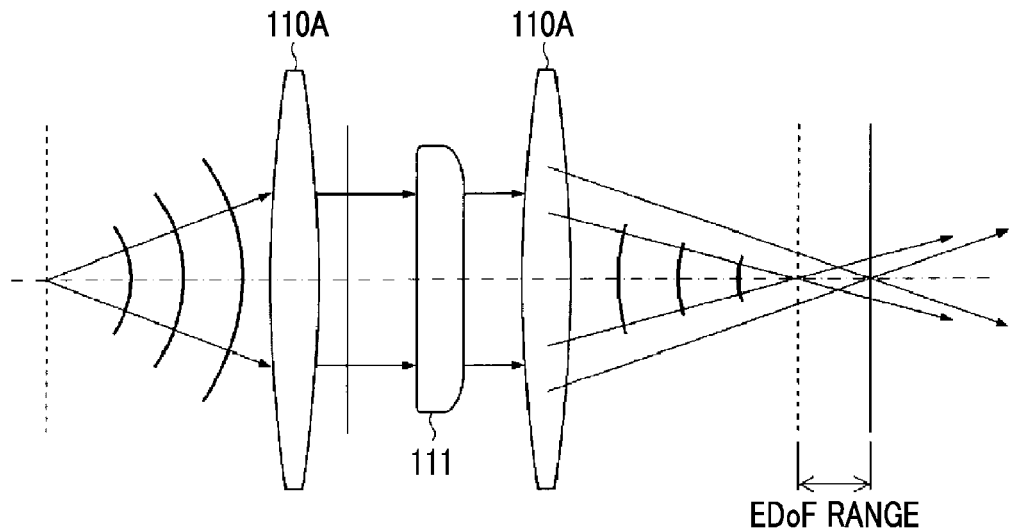
FIG. 16 is a diagram illustrating an example of the EDoF optical system.

FIG. 16 is a diagram illustrating an example of the EDoF optical system 110. The EDoF optical system 110 according to this example includes fixed single-focus imaging lenses 110A and an optical filter 111 which is disposed at a pupil position. The optical filter 111 modulates a phase to make the EDoF optical system 110 (photographing lens 110A) have the extended depth of field such that the extended depth of field (the extended depth of focus) (EDoF) is obtained. As such, the imaging lenses 110A and the optical filter 111 form a lens unit which modulates the phase to extend the depth of field.

The EDoF optical system 110 includes other components, if necessary. For example, a diaphragm (not illustrated) is provided in the vicinity of the optical filter 111. The optical filter 111 may be one filter or may be a combination of a plurality of filters. The optical filter 111 is an example of optical phase modulation means and the EDoF of the EDoF optical system 110 (imaging lens 110A) may be achieved by other means. For example, the EDoF of the EDoF optical system 110 may be achieved by the imaging lens 110A that is designed to have the same function as the optical filter 111 according to this example, instead of the optical filter 111.

That is, the EDoF of the EDoF optical system 110 can be achieved by various means for changing the wavefront of light focused on a light receiving surface of the imaging element 112. For example, "an optical element with a variable thickness", "an optical element with a variable refractive index (for example, a refractive-index-distribution-type wavefront modulation lens)", "an optical element of which the thickness or refractive index varies due to, for example, a coated lens surface (for example, a wavefront modulation hybrid lens or an optical element formed on a lens surface as a phase plane)", or "a liquid crystal element capable of modulating a phase distribution of light (for example, a liquid crystal spatial phase modulation element)" may be used as EDoF means of the EDoF optical system 110. As such, the invention can be applied to not only a case in which an image which is regularly dispersed by an optical wavefront modulation element (the optical filter 111 (phase plate)) can be formed but also a case in which the same dispersed image as that obtained by the optical wavefront modulation element can be formed by the imaging lens 110A, without using the optical wavefront modulation element.

The EDoF optical system 110 illustrated in FIG. 16 can be reduced in size since a focus adjustment mechanism which mechanically adjusts the focus can be omitted, and can be preferably provided in a mobile phone or a portable information terminal with a camera.

An optical image which has passed through the EDoF optical system 110 having the EDoF is formed on the imaging element 112 illustrated in FIG. 15 and is converted into an electric signal.

The imaging element 112 includes a plurality of pixels which are arranged in a matrix using a predetermined pattern array (for example, a Bayer array, a G stripe R/G full checkered pattern, an X-Trans array, or a honeycomb array). Each pixel includes a microlens, a color filter (in this example, RGB color filters), and a photodiode. An optical image which is incident on the light receiving surface of the imaging element 112 through the EDoF optical system 110 is converted into a signal charge corresponding to the amount of incident light by each photodiode arranged on the light receiving surface. The R, G, and B signal charges accumulated in each photodiode are sequentially output as voltage signals (image signals) for each pixel.

The AD conversion unit 114 converts the analog R, G, and B image signals for each pixel which are output from the imaging element 112 into digital R, G, and B image signals. The digital image signals converted by the AD conversion unit 114 are applied to the restoration processing block 120.

The restoration processing block 120 includes, for example, a black level adjustment unit 122, a white balance gain unit 123, a gamma processing unit 124, a demosaic processing unit 125, an RGB/YCrCb conversion unit 126, and a Y signal restoration processing unit 127.

The black level adjustment unit 122 performs black level adjustment for the digital image signals output from the AD conversion unit 114. A known method may be used for the black level adjustment. For example, in a case in which attention is focused on a certain effective photoelectric conversion element, the average of dark current acquisition signals corresponding to each of a plurality of OB photoelectric conversion elements which are included in a photoelectric conversion element row including the effective photoelectric conversion element is calculated and the average is subtracted from the dark current acquisition signals corresponding to the effective photoelectric conversion element to perform the black level adjustment.

The white balance gain unit 123 performs gain adjustment according to the white balance gain of each of the R, G, and B signals included in the digital image signals of which the black level data has been adjusted.

The gamma processing unit 124 performs gamma correction for correcting gradation, such as halftone, such that the R, G, and B image signals subjected to the white balance adjustment have desired gamma characteristics.

The demosaic processing unit 125 performs a demosaicing process for the R, G, and B image signals subjected to the gamma correction. Specifically, the demosaic processing unit 125 performs a color interpolation process for the R, G, and B image signals to generate a set of image signals (an R signal, a G signal, and a B signal) output from each light receiving pixel of the imaging element 112. That is, while a pixel signal output from each light receiving pixel is any one of the R, G, and B image signals before a color demosaicing process, a set of three pixel signals, which are R, G, and B signals corresponding to each light receiving pixel, is output after the color demosaicing process.

The RGB/YCrCb conversion unit 126 converts the R, G, and B signals for each pixel which have been subjected to the demosaicing process into a brightness signal Y and color difference signals Cr and Cb and outputs the brightness signal Y and the color difference signals Cr and Cb of each pixel.

The Y signal restoration processing unit 127 performs a restoration process for the brightness signal Y output from the RGB/YCrCb conversion unit 126 on the basis of a restoration filter which is stored in advance. The restoration filter includes, for example, a deconvolution kernel (corresponding to the number of taps of M=7 and N=7) having a kernel size of 7×7 and a calculation coefficient (corresponding to restoration gain data and a filter coefficient) corresponding to the deconvolution kernel and is used for a deconvolution process (reverse convolution process) corresponding to the phase modulation of the optical filter 111. The restoration filter corresponding to the optical filter 111 is stored in a memory (not illustrated) (for example, a memory in which the Y signal restoration processing unit 127 is incidentally provided). The size of the deconvolution kernel is not limited to 7×7. In addition, the Y signal restoration processing unit 127 has the function of the sharpening process of the image processing unit 36.

Figure 17:
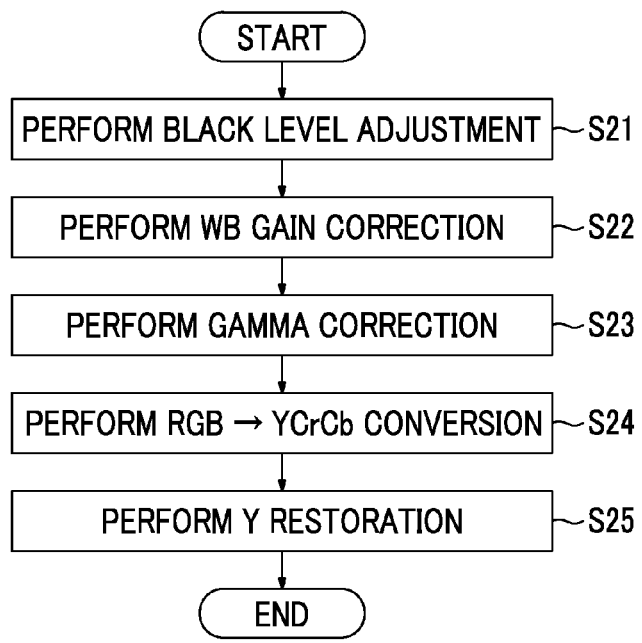
FIG. 17 is a diagram illustrating an example of the flow of a restoration process by a restoration processing block illustrated in FIG. 15.

Next, the restoration process of the restoration processing block 120 will be described. FIG. 17 is a diagram illustrating an example of the flow of the restoration process performed by the restoration processing block 120 illustrated in FIG. 15.

The digital image signal is applied from the AD conversion unit 114 to one input of the black level adjustment unit 122 and black level data is applied to the other input of the black level adjustment unit 122. The black level adjustment unit 122 subtracts the black level data from the digital image signal and outputs the digital image signal, from which the black level data has been subtracted, to the white balance gain unit 123 (Step S21). In this way, no black level components are included in the digital image signal and a digital image signal indicating the black level becomes 0.

The image data subjected to the black level adjustment is sequentially processed by the white balance gain unit 123 and the gamma processing unit 124 (Steps S22 and S23).

The demosaic processing unit 125 performs a demosaicing process for the R, G, and B signals subjected to the gamma correction and the RGB/YCrCb conversion unit 126 converts the R, G, and B signals into the brightness signal Y and the color difference signals Cr and Cb (Step S24).

The Y signal restoration processing unit 127 applies a deconvolution process corresponding to the phase modulation of the optical filter 111 of the EDoF optical system 110 to the brightness signal Y to perform a restoration process (Step S25). That is, the Y signal restoration processing unit 127 performs the deconvolution process (reverse convolution process) for brightness signals (here, brightness signals from 7×7 pixels) corresponding to a predetermined unit pixel group which has an arbitrary pixel to be processed as the center and the restoration filter (the deconvolution kernel having a kernel size of 7×7 and the calculation coefficient thereof) which has been stored in, for example, the memory in advance. The Y signal restoration processing unit 127 repeatedly performs the deconvolution process for each predetermined unit pixel group so as to cover the entire imaging surface, thereby performing a restoration process of removing the blurring of the entire image. The restoration filter is determined according to the position of the center of the pixel group to be subjected to the deconvolution process. That is, a common restoration filter is applied to adjacent pixel groups. In addition, it is preferable to apply a common restoration filter to all pixel groups in order to simplify the restoration process.

Figure 18:
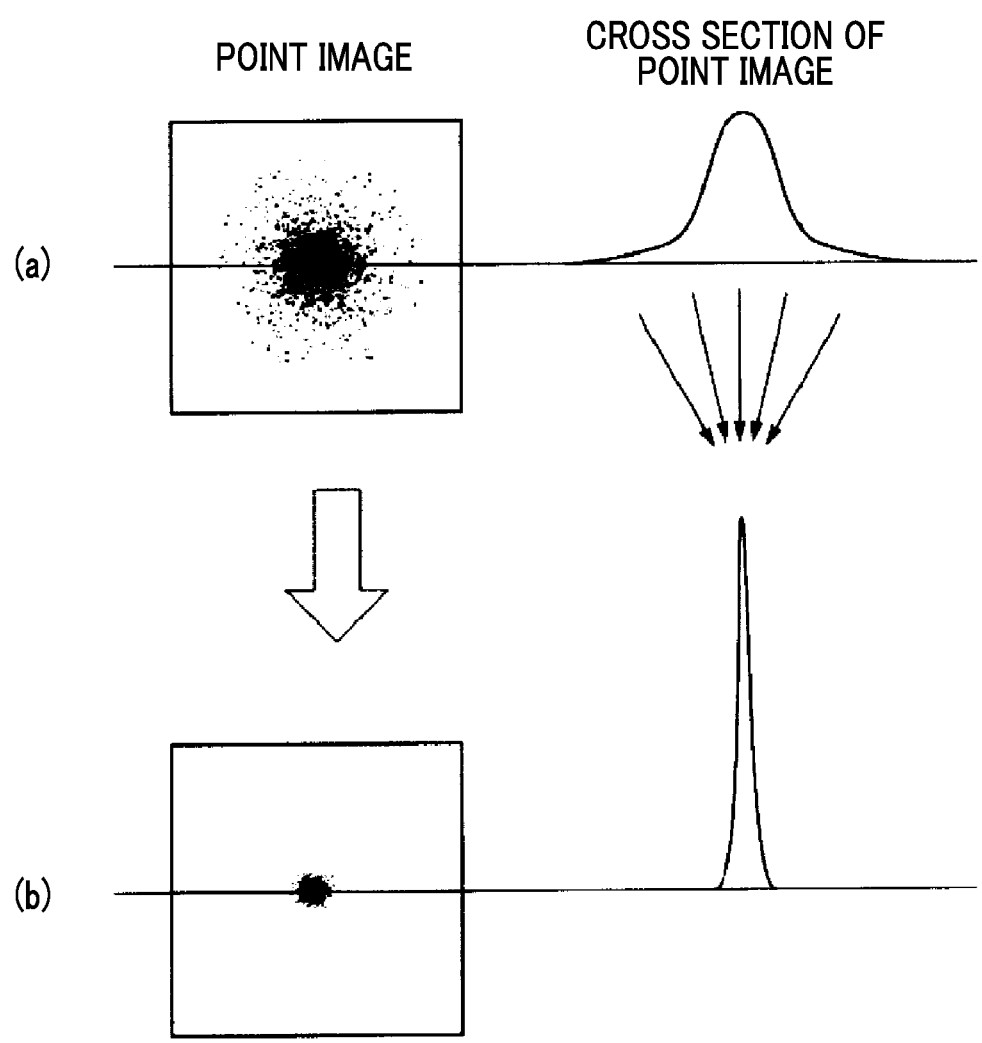
FIG. 18 is a diagram illustrating an example of the restoration of an image acquired through the EDoF optical system. (a) of FIG. 18 illustrates a blurred image before the restoration process and (b) of FIG. 18 illustrates an image (point image) from which blurring is removed after the restoration process.

As illustrated in (a) of FIG. 18, a point image (optical image) of the brightness signal which has passed through the EDoF optical system 110 is formed as a large point image (blurred image) on the imaging element 112. However, the point image is restored to a small point image (high-resolution image) by the deconvolution process of the Y signal restoration processing unit 127, as illustrated in (b) of FIG. 18.

As described above, the restoration process is applied to the brightness signal subjected to the demosaicing process. Therefore, it is not necessary to separately provide the parameters of the restoration process for R, G, and B and it is possible to perform the restoration process at a high speed. Furthermore, the deconvolution process is not performed for one unit of the R, G, and B image signals corresponding to the R, G, and B pixels at discrete positions, but a common restoration filter is applied to a predetermined unit of the brightness signals of adjacent pixels to perform the deconvolution process. Therefore, the accuracy of the restoration process is improved. For the color difference signals Cr and Cb, resolution does not need to be increased by the restoration process in terms of image quality due to the visual characteristic of the human eye. In a case in which an image is recorded in a compression format, such as a JPEG format, the color difference signal is compressed at a higher compression ratio than the brightness signal. Therefore, the necessity to increase resolution using the restoration process is reduced. As a result, it is possible to improve the accuracy of restoration, to simplify the process, and to improve the processing speed.

The point image restoration process according to the above-described embodiments can also be applied to the restoration process of the EDoF system.

An aspect to which the invention can be applied is not limited to the digital camera and the computer (server). The invention can be applied to mobile devices having an imaging function and functions (a calling function, a communication function, and other computer functions) other than the imaging function, in addition to cameras having an imaging function as a main function. For example, mobile phones, smart phones, personal digital assistants (PDAs), and portable game machines having a camera function are given as other aspects to which the invention can be applied. Hereinafter, an example of a smart phone to which the invention can be applied will be described.

<Application Example to Smart Phone>

Figure 19:
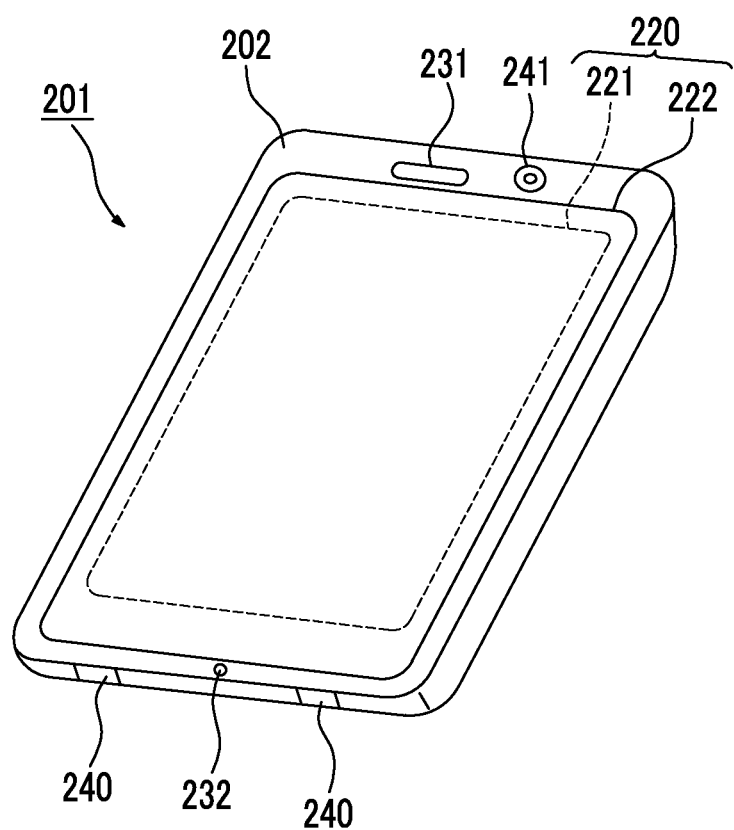
FIG. 19 is a diagram illustrating the outward appearance of a smart phone.

FIG. 19 is a diagram illustrating the outward appearance of a smart phone 201. The smart phone 201 illustrated in FIG. 19 comprises a housing 202 with a flat panel shape and a display input unit 220 having a display panel 221 as a display unit and an operation panel 222 as an input unit which are integrally formed on one surface of the housing 202. The housing 202 comprises a speaker 231, a microphone 232, an operating unit 240, and a camera unit 241. However, the configuration of the housing 202 is not limited thereto. For example, the display unit and the input unit may be independently provided, or the housing 202 may have a folding structure or a sliding structure.

Figure 20:
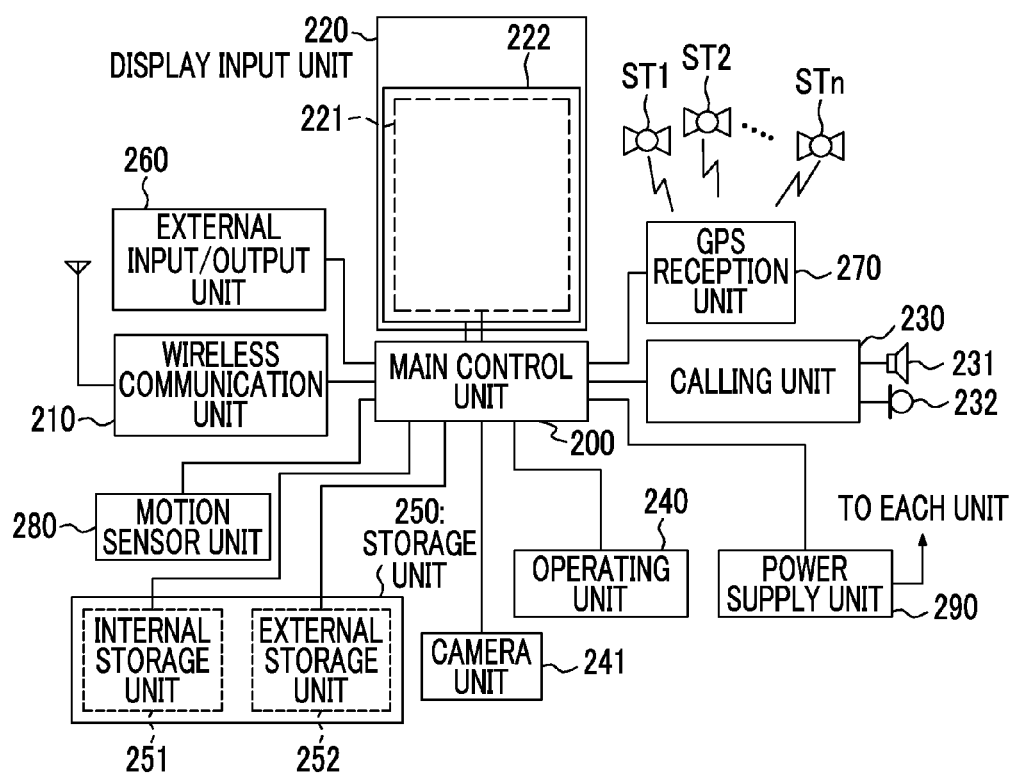
FIG. 20 is a block diagram illustrating the structure of the smart phone illustrated in FIG. 19.

FIG. 20 is a block diagram illustrating the structure of the smart phone 201 illustrated in FIG. 19. As illustrated in FIG. 20, the smart phone comprises, as main components, a wireless communication unit 210, the display input unit 220, a calling unit 230, the operating unit 240, the camera unit 241, a storage unit 250, an external input/output unit 260, a global positioning system (GPS) receiving unit 270, a motion sensor unit 280, a power supply unit 290, and a main control unit 200 (including the body controller 28). The smart phone 201 has, as a main function, a wireless communication function which performs mobile wireless communication through a base station apparatus BS and a mobile communication network NW.

The wireless communication unit 210 performs wireless communication with the base station apparatus BS which is accommodated in the mobile communication network NW in response to an instruction from the main control unit 200. The wireless communication is used to transmit and receive various types of file data, such as voice data and image data, and electronic mail data or to receive, for example, web data and streaming data.

The display input unit 220 is a so-called touch panel that displays, for example, images (still images and moving images) or text information to visually transmit information to the user and detects the user's operation for the displayed information under the control of the main control unit 200 and comprises the display panel 221 and the operation panel 222.

The display panel 221 uses, for example, a liquid crystal display (LCD) or an organic electro-luminescence display (OELD) as a display device. The operation panel 222 is a device that is provided such that an image displayed on a display surface of the display panel 221 is visually recognized and detects one or a plurality of coordinate points operated by a finger of the user or a stylus. When the device is operated by a finger of the user or a stylus, a detection signal which is generated by the operation is output to the main control unit 200. Then, the main control unit 200 detects an operation position (coordinates) on the display panel 221 on the basis of the received detection signal.

As illustrated in FIG. 19, the display panel 221 and the operation panel 222 of the smart phone 201 which is an embodiment of the imaging apparatus according to the invention are integrated to form the display input unit 220 and the operation panel 222 is arranged so as to completely cover the display panel 221. In a case in which this arrangement is used, the operation panel 222 may have a function of detecting the user's operation even in a region other than the display panel 221. In other words, the operation panel 222 may comprise a detection region (hereinafter, referred to as a display region) for an overlap portion which overlaps the display panel 221 and a detection region (hereinafter, referred to as a non-display region) for an outer edge portion which does not overlap the display panel 221.

The size of the display region may be exactly equal to the size of the display panel 221. However, the sizes are not necessarily equal to each other. The operation panel 222 may comprise two sensitive regions, that is, an outer edge portion and an inner portion other than the outer edge portion. The width of the outer edge portion is appropriately designed according to, for example, the size of the housing 202. Examples of a position detecting method which is used in the operation panel 222 include a matrix switching method, a resistive film method, a surface elastic wave method, an infrared method, an electromagnetic induction method, and a capacitive sensing method. Any of the methods may be used.

The calling unit 230 comprises the speaker 231 and the microphone 232. The calling unit 230 converts the voice of the user which is input through the microphone 232 into voice data which can be processed by the main control unit 200 and outputs the converted voice data to the main control unit 200. In addition, the calling unit 230 decodes voice data received by the wireless communication unit 210 or the external input/output unit 260 and outputs the decoded voice data from the speaker 231. As illustrated in FIG. 19, for example, the speaker 231 can be mounted on the same surface as the display input unit 220 and the microphone 232 can be mounted on a side surface of the housing 202.

The operating unit 240 is a hardware key which uses, for example, a key switch and receives instructions from the user. For example, as illustrated in FIG. 19, the operating unit 240 is a push button switch which is mounted on the side surface of the housing 202 of the smart phone 201, is turned on when it is pressed by, for example, a finger, and is turned off by the restoring force of a spring when the finger is taken off.

The storage unit 250 stores a control program or control data of the main control unit 200, application software, address data which is associated with, for example, the names or phone numbers of communication partners, transmitted and received electronic mail data, web data which is downloaded by web browsing, and downloaded content data. In addition, the storage unit 250 temporarily stores, for example, streaming data. The storage unit 250 includes an internal storage unit 251 which is provided in the smart phone and an external storage unit 252 having an external memory slot that is detachable and attachable. The internal storage unit 251 and the external storage unit 252 forming the storage unit 250 are implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 260 functions as an interface with all of the external apparatuses connected to the smart phone 201 and is directly or indirectly connected to other external apparatuses by communication (for example, universal serial bus (USB) communication or IEEE1394) or a network (for example, the Internet, a wireless LAN, a Bluetooth (registered trademark) network, a radio frequency identification (RFID) network, an infrared data association (IrDA) (registered trademark) network, an ultra wideband (UWB) (registered trademark) network, or a ZigBee (registered trademark) network).

Examples of the external apparatus connected to the smart phone 201 include a wired/wireless headset, a wired/wireless external charger, a wired/wireless data port, a memory card or a subscriber identity module (SIM)/user identity module (UIM) card which is connected through a card socket, an external audio/video apparatus which is connected through audio/video input/output (I/O) terminals, a wirelessly connected external audio/video apparatus, a smart phone which is connected wirelessly or in a wired manner, a personal computer which is connected wirelessly or in a wired manner, a PDA which is connected wirelessly or in a wired manner, and an earphone. The external input/output unit may transmit data which is received from the external apparatus to each component of the smart phone 201 or may transmit data in the smart phone 201 to the external apparatus.

The GPS receiving unit 270 receives GPS signals transmitted from GPS satellites ST1 to STn and performs a position measurement process on the basis of the received GPS signals to detect a position including the latitude, longitude, and height of the smart phone 201, in response to an instruction from the main control unit 200. When the GPS receiving unit 270 can acquire positional information from the wireless communication unit 210 or the external input/output unit 260 (for example, the wireless LAN), the GPS receiving unit 270 can detect the position using the positional information.

The motion sensor unit 280 comprises, for example, a triaxial acceleration sensor and detects the physical movement of the smart phone 201 in response to an instruction from the main control unit 200. When the physical movement of the smart phone 201 is detected, the moving direction or acceleration of the smart phone 201 is detected. The detection result is output to the main control unit 200.

The power supply unit 290 supplies power which is stored in a battery (not illustrated) to each unit of the smart phone 201 in response to an instruction from the main control unit 200.

The main control unit 200 comprises a microprocessor, operates on the basis of the control program or control data stored in the storage unit 250, and controls the overall operation of each unit of the smart phone 201. The main control unit 200 has an application processing function and a mobile communication control function of controlling each unit of a communication system in order to perform voice communication or data communication through the wireless communication unit 210.

The application processing function is implemented by the operation of the main control unit 200 based on the application software which is stored in the storage unit 250. Examples of the application processing function include an infrared communication function which controls the external input/output unit 260 such that data communication with an opposing apparatus is performed, an electronic mail function which transmits and receives electronic mail, and a web browsing function which browses web pages.

The main control unit 200 has, for example, an image processing function which displays an image on the display input unit 220 on the basis of image data (still image data or moving image data) such as received data or downloaded streaming data. The image processing function means the function of the main control unit 200 decoding the image data, performing image processing on the decoding result, and displaying the image on the display input unit 220.

The main control unit 200 performs display control for the display panel 221 and operation detection control for detecting the operation of the user through the operating unit 240 and the operation panel 222.

The main control unit 200 performs the display control to display a software key, such as an icon for starting application software or a scroll bar, or to display a window for writing electronic mail. The scroll bar means a software key for receiving an instruction to move a displayed portion of an image that is too large to fit into the display region of the display panel 221.

The main control unit 200 performs the operation detection control to detect the operation of the user input through the operating unit 240, to receive an operation for the icon or the input of a character string to an input field of the window through the operation panel 222, or to receive a request to scroll the displayed image through the scroll bar.

In addition, the main control unit 200 has a touch panel control function that performs the operation detection control to determine whether the position of an operation for the operation panel 222 is an overlap portion (display region) which overlaps the display panel 221 or an outer edge portion (non-display region) which does not overlap the display panel 221 other than the overlap portion and controls a sensitive region of the operation panel 222 or the display position of the software key.

The main control unit 200 can detect a gesture operation for the operation panel 222 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 241 is a digital camera which captures images using an imaging element such as a complementary metal oxide semiconductor (CMOS) or a charge-coupled device (CCD). In addition, the camera unit 241 can convert captured image data into image data which is compressed in, for example, a Joint Photographic Coding Experts Group (JPEG) format, store the converted image data in the storage unit 250, and output the converted image data through the external input/output unit 260 or the wireless communication unit 210, under the control of the main control unit 200. As illustrated in FIG. 19, the camera unit 241 is mounted on the same surface as the display input unit 220 in the smart phone 201. However, the mounting position of the camera unit 241 is not limited thereto. For example, the camera unit 241 may be mounted on the rear surface of the display input unit 220 or a plurality of camera units 241 may be mounted. In a case in which a plurality of camera units 241 are mounted, the camera units 241 which are used to capture images may be switched such that a single camera unit captures images or the plurality of camera units 241 may be simultaneously used to capture images.

The camera unit 241 can be used for various functions of the smart phone 201. For example, the image acquired by the camera unit 241 can be displayed on the display panel 221 or the image captured by the camera unit 241 can be used as one of the operation inputs of the operation panel 222. When the GPS receiving unit 270 detects the position, the position may be detected with reference to the image from the camera unit 241. In addition, the optical axis direction of the camera unit 241 in the smart phone 201 may be determined or the current usage environment may be determined, with reference to the image from the camera unit 241, using the triaxial acceleration sensor or without using the triaxial acceleration sensor. Of course, the image from the camera unit 241 may be used in the application software.

For example, the positional information which is acquired by the GPS receiving unit 270, the voice information which is acquired by the microphone 232 (for example, the main control unit may convert the voice information into text information), and the posture information which is acquired by the motion sensor unit 280 may be added to the image data of a still image or a moving image and the image data may be stored in the storage unit 250 or may be output through the external input/output unit 260 or the wireless communication unit 210.

The image processing unit 36 may be implemented by, for example, the main control unit 200.

The invention is not limited to the above-described embodiments and various modifications and changes of the invention can be made without departing from the scope and spirit of the invention.

EXPLANATION OF REFERENCES

10: digital camera
12: lens unit
14: camera body
16: lens
17: diaphragm
18: optical system operation unit
20: lens unit controller
22: lens unit input/output unit
26: imaging element
28: body controller
29: image storage unit
30: camera body input/output unit
32: input/output interface
34: device control unit
36: image processing unit
37: display control unit
38: display unit
40: information acquisition unit
42: filter acquisition unit
44: filter processing unit
46: filter selection unit
48: filter storage unit
50: function acquisition unit
52: filter generation unit
60: filter application unit
62: gain control unit
63: gain adjustment unit
64: data adjustment unit
66: frequency analysis unit
68: saturated pixel analysis unit 70: ringing acquisition unit
72: increment acquisition unit
80: computer
81: computer input/output unit
82: computer controller
83: display
84: network
85: server
86: server input/output unit
87: server controller
101: imaging module
110: EDoF optical system
110A: imaging lens
111: optical filter
112: imaging element
114: AD conversion unit
120: restoration processing block
122: black level adjustment unit
123: white balance gain unit
124: gamma processing unit
125: demosaic processing unit
126: RGB/YCrCb conversion unit
127: Y signal restoration processing unit
200: main control unit
201: smart phone
202: housing
210: wireless communication unit
220: display input unit
221: display panel
222: operation panel
230: calling unit
231: speaker
232: microphone
240: operating unit
241: camera unit
250: storage unit
251: internal storage unit
252: external storage unit
260: external input/output unit
270: GPS receiving unit
280: motion sensor unit
290: power supply unit

What is claimed is:

1. An image processing device comprising:
an information acquisition circuit that acquires imaging information of original image data which is acquired by capturing an object image using an optical system;
a filter acquisition circuit that acquires a sharpening filter on the basis of at least a first imaging condition or a second imaging condition; and
a filter processing circuit that applies the sharpening filter acquired by the filter acquisition circuit to the original image data to acquire sharp image data,
wherein, in a case in which the imaging information acquired by the information acquisition circuit includes the first imaging condition and does not include the second imaging condition, the filter acquisition circuit acquires the sharpening filter which is associated with the first imaging condition included in the imaging information and is associated with a representative condition of the second imaging condition.

2. The image processing device according to claim 1, wherein one of the first imaging condition and the second imaging condition is a F number and the other is a focal length.

3. The image processing device according to claim 1, wherein the sharpening filter is based on an optical transfer function of the optical system.

4. The image processing device according to claim 1, wherein the sharpening filter is not based on an optical transfer function of the optical system.

5. The image processing device according to claim 1, wherein the filter acquisition circuit acquires a plurality of sharpening filters associated with a plurality of image heights, and
the filter processing circuit applies the sharpening filter to the original image data according to the image height.

6. The image processing device according to claim 1, wherein the filter acquisition circuit includes:
a filter storage that stores a plurality of sharpening filters which are determined according to at least the first imaging condition or the second imaging condition; and
a filter selection circuit that selects the sharpening filter based on the imaging information from the plurality of sharpening filters stored in the filter storage.

7. The image processing device according to claim 1, wherein the filter acquisition circuit includes:
a function acquisition circuit that acquires a plurality of optical transfer functions which are determined according to at least the first imaging condition or the second imaging condition; and
a filter generation circuit that generates the sharpening filter from an optical transfer function, which is selected from the plurality of optical transfer functions acquired by the function acquisition circuit and is based on the imaging information, and acquires the sharpening filter.

8. The image processing device according to claim 1, wherein the representative condition of the second imaging condition is determined on the basis of spatial frequency characteristics of each of a plurality of sharpening filters associated with the first imaging condition.

9. The image processing device according to claim 8, wherein the representative condition of the second imaging condition is determined on the basis of a maximum value of a response indicating a ratio of image data after each of the plurality of sharpening filters, which are associated with the first imaging condition and are associated with a plurality of second imaging conditions, is applied to image data before the sharpening filter is applied for each spatial frequency.

10. The image processing device according to claim 8, wherein the representative condition of the second imaging condition is determined on the basis of an area of a range in which a response indicating a ratio of image data after each of the plurality of sharpening filters, which are associated with the first imaging condition and are associated with a plurality of second imaging conditions, is applied to image data before the sharpening filter is applied for each spatial frequency is greater than a first threshold value in a function indicating the response for each spatial frequency in a coordinate system in which a horizontal axis indicates the spatial frequency and a vertical axis indicates the response.

11. The image processing device according to claim 10, wherein the first threshold value is equal to or greater than 1.

12. The image processing device according to claim 1, further comprising:

a frequency analysis circuit that analyzes spatial frequency characteristics of the original image data, wherein, in a case in which it is determined that the number of components of the original image data in a specific spatial frequency range is equal to or greater than a second threshold value on the basis of an analysis result of the frequency analysis circuit, the filter acquisition circuit acquires the sharpening filter having a response which indicates the ratio of image data after the sharpening filter is applied to image data before the sharpening filter is applied for each spatial frequency and is lower than that of the sharpening filter associated with the representative condition of the second imaging condition.

13. The image processing device according to claim 12, wherein the specific spatial frequency range is included in a range that is equal to or greater than one eighth of a sampling frequency of the original image data and is equal to or less than one fourth of the sampling frequency.

14. The image processing device according to claim 1, further comprising:

a frequency analysis circuit that analyzes spatial frequency characteristics of the original image data, wherein, in a case in which it is determined that the number of components of the original image data in a specific spatial frequency range is equal to or greater than a second threshold value on the basis of an analysis result of the frequency analysis circuit, the filter processing circuit controls gain to reduce an increment in the sharp image data with respect to the original image data.

15. The image processing device according to claim 1, further comprising:

a saturated pixel analysis circuit that analyzes a saturated pixel of the original image data, wherein, in a case in which it is determined that the original image data includes a saturated pixel having a pixel value that is equal to or greater than a third threshold value on the basis of an analysis result of the saturated pixel analysis circuit, the filter acquisition circuit acquires the sharpening filter having a response which indicates the ratio of image data after the sharpening filter is applied to image data before the sharpening filter is applied for each spatial frequency and is lower than that of the sharpening filter associated with the representative condition of the second imaging condition.

16. The image processing device according to claim 1, further comprising:

a saturated pixel analysis circuit that analyzes a saturated pixel of the original image data, wherein, in a case in which it is determined that the original image data includes a saturated pixel having a pixel value that is equal to or greater than a third threshold value on the basis of an analysis result of the saturated pixel analysis circuit, the filter processing circuit controls gain to reduce an increment in the sharp image data with respect to the original image data.

17. The image processing device according to claim 1, further comprising:

a ringing acquisition circuit that acquires an amount of ringing of the sharp image data, wherein, in a case in which the amount of ringing is equal to or greater than a fourth threshold value, the filter acquisition circuit acquires the sharpening filter having a response which indicates the ratio of image data after the sharpening filter is applied to image data before the sharpening filter is applied for each spatial frequency and is lower than that of the sharpening filter associated with the representative condition of the second imaging condition.

18. The image processing device according to claim 1, further comprising:

a ringing acquisition circuit that acquires an amount of ringing of the sharp image data, wherein, in a case in which the amount of ringing is equal to or greater than a fourth threshold value, the filter processing circuit controls gain to reduce an increment in the sharp image data with respect to the original image data.

19. The image processing device according to claim 1, further comprising:

an increment acquisition circuit that acquires an increment in the sharp image data with respect to the original image data in a specific spatial frequency range, wherein, in a case in which the increment is equal to or greater than a fifth threshold value, the filter acquisition circuit acquires the sharpening filter having a response which indicates the ratio of image data after the sharpening filter is applied to image data before the sharpening filter is applied for each spatial frequency and is lower than that of the sharpening filter associated with the representative condition of the second imaging condition.

20. The image processing device according to claim 1, further comprising:

an increment acquisition circuit that acquires an increment in the sharp image data with respect to the original image data in a specific spatial frequency range, wherein, in a case in which the increment is equal to or greater than a fifth threshold value, the filter processing circuit controls gain to reduce the increment in the sharp image data with respect to the original image data.

21. An imaging apparatus comprising:

an imaging element; and the image processing device according to claim 1, wherein the original image data is acquired by the imaging element.

22. An image processing method using an image processing device comprising:

an information acquisition circuit that acquires imaging information of original image data which is acquired by capturing an object image using an optical system;

a filter acquisition circuit that acquires a sharpening filter on the basis of at least a first imaging condition or a second imaging condition; and a filter processing circuit that applies the sharpening filter acquired by the filter acquisition circuit to the original image data to acquire sharp image data, said method comprising:

acquiring imaging information of original image data which is acquired by capturing the object image using the optical system;

acquiring the sharpening filter on the basis of at least the first imaging condition or the second imaging condition; and applying the sharpening filter to the original image data to acquire sharp image data, wherein, in a case in which the imaging information includes the first imaging condition and does not include the second imaging condition, the sharpening filter which is associated with the first imaging condition included in the imaging information and is associated with a representative condition of the second imaging condition is acquired.

23. A non-transitory computer readable recording medium storing a program that causes a computer to perform the imaging apparatus according to claim, comprising:
   a step of acquiring imaging information of original image data which is acquired by capturing an object image using an optical system;
   a step of acquiring a sharpening filter on the basis of at least a first imaging condition or a second imaging condition; and
   a step of applying the sharpening filter to the original image data to acquire sharp image data,
   wherein, in a case in which the imaging information includes the first imaging condition and does not include the second imaging condition, the sharpening filter which is associated with the first imaging condition included in the imaging information and is associated with a representative condition of the second imaging condition is acquired.

* * * * *